(12) United States Patent
Montgomery, Jr.

(10) Patent No.: US 7,388,872 B2
(45) Date of Patent: Jun. 17, 2008

(54) DYNAMIC COMMUNICATION CHANNEL ALLOCATION METHOD AND SYSTEM

(76) Inventor: Charles D. Montgomery, Jr., 1432 Cross Bend Rd., Plano, TX (US) 75032

( * ) Notice: Subject to any disclaimer, the term of this patent is extended or adjusted under 35 U.S.C. 154(b) by 824 days.

(21) Appl. No.: 10/118,084

(22) Filed: Apr. 8, 2002

(65) Prior Publication Data

US 2002/0181503 A1  Dec. 5, 2002

Related U.S. Application Data

(60) Provisional application No. 60/282,318, filed on Apr. 6, 2001.

(51) Int. Cl.
*H04L 12/427* (2006.01)
(52) U.S. Cl. .......................... 370/404; 370/452
(58) Field of Classification Search ................ 370/355, 370/360, 389, 401, 535–536, 542
See application file for complete search history.

(56) References Cited

U.S. PATENT DOCUMENTS

| | | | | | |
|---|---|---|---|---|---|
| 4,797,879 | A | * | 1/1989 | Habbab et al. | 398/51 |
| 5,390,173 | A | * | 2/1995 | Spinney et al. | 370/393 |
| 5,414,704 | A | * | 5/1995 | Spinney | 370/389 |
| 5,903,569 | A | * | 5/1999 | Fujisaki | 370/472 |
| 6,009,106 | A | * | 12/1999 | Rustad et al. | 370/523 |
| 6,032,185 | A | * | 2/2000 | Asano | 709/227 |
| 6,594,050 | B2 | * | 7/2003 | Jannson et al. | 398/52 |
| 6,647,429 | B1 | * | 11/2003 | Semal | 709/251 |
| 6,766,113 | B1 | * | 7/2004 | Al-Salameh et al. | 398/30 |

(Continued)

FOREIGN PATENT DOCUMENTS

WO   WO97/50212   * 12/1997

OTHER PUBLICATIONS

Marsan, M.A.; Bianco, A.; Leonardi, E.; Meo, M.; Neri, F.(MAC protocols and fairness control in WDM multirings with tunable transmitters and fixed receivers; Lightwave Technology, Journal of vol. 14, Issue 6, Jun. 1996 pp. 1230-1244) ☐☐.*

(Continued)

*Primary Examiner*—Edan Orgad
*Assistant Examiner*—Salman Ahmed
(74) *Attorney, Agent, or Firm*—David W. Carstens; Carstens & Cahoon, LLP

(57) ABSTRACT

A bandwidth brokering system and method incorporating methodology for supporting self-healing communication rings is disclosed. The present invention utilizes state-based tokens that are transmitted on a separate communication channel between network nodes to monitor and correct communication failures occurring at a link, interface, and network node level. The invention as taught permits generic brokering of all available network bandwidth in a granular method without the need for fixed designations of "protection" or "working" communication paths. As such, the present invention permits integration of "protection" and "working" communication data paths to permit full utilization of available system bandwidth with graceful recovery in the event of system or link malfunctions. While the present invention is optimally adapted to use in optical communications systems and specifically those incorporating wavelength division multiplexing (WDM), dense wavelength division multiplexing (DWDM), and ultra-dense wavelength division multiplexing, the teachings presented are equally well adapted to situations where other communications mediums are utilized in a multi-carrier, wireless, or spread-spectrum environment, among others.

7 Claims, 30 Drawing Sheets

U.S. PATENT DOCUMENTS

| | | | | |
|---|---|---|---|---|
| 6,975,626 | B1* | 12/2005 | Eberle et al. | 370/358 |
| 6,985,455 | B1* | 1/2006 | Heath et al. | 370/316 |
| 7,006,472 | B1* | 2/2006 | Immonen et al. | 370/332 |
| 2001/0007557 | A1* | 7/2001 | Yamada et al. | 370/389 |
| 2002/0126343 | A1* | 9/2002 | Fumagalli et al. | 359/118 |
| 2002/0133756 | A1* | 9/2002 | Jain | 714/43 |
| 2005/0243858 | A1* | 11/2005 | Vitebsky et al. | 370/447 |
| 2006/0092958 | A1* | 5/2006 | Tancevski | 370/404 |

OTHER PUBLICATIONS

Senior, J.M.; Handley, M.R.; Leeson, M.S.(Developments in wavelength division multiple access networking Communications Magazine, IEEE vol. 36, Issue 12, Dec. 1998 pp. 28-36) ☐☐.*

Jue, J.P.; Mukherjee, B.(Multiconfiguration multihop protocols: a new class of protocols for packet-switched WDM optical networks Networking, IEEE/ACM Transactions on vol. 8, Issue 5, Oct. 2000 pp. 631-642) ☐☐.*

Cai, J.; Fumagalli, A.; Chlamtac, I.(The multitoken interarrival time (MTIT) access protocol for supporting variable size packets over WDM ring network Selected Areas in Communications, IEEE Journal on vol. 18, Issue 10, Oct. 2000 pp. 2094-2104.*

C.A. Soul, Optical Switch maker Coriolis sees solid future in storage area networking, Mass High Tech, Feb. 19-25, 2001, p. 7, Boston MA.

Timothy K. Cahall, Bandwidth Trading will Unleash the Fiber Glut, Fiberoptic Product News, Mar. 2001, pp. 16 and 18, Rockaway, NJ.

Lisa Coleman, Enron launches capacity-trading market, Infostor, Mar. 2001, p. 18, Nashua, NH.

Scott Boyter, A look at optical networking for 2001, Telecommunications, Jan. 8-14, 2001, p. 14, Dallas TX.

Chappell Brown, Photonic switch routes opto-nets, Electronic Engineering Times, Dec. 11, 2000, pp. 91 and 93, Manhasset, NY.

Meghan Fuller, Long-anticipated all-optical switches begin to reach customers, Lightwave, Dec. 2000, pp. 1 and 44, Rockaway, NJ.

Rick Thompson, Redirecting the light with intelligent optical switches, Lightwave, Dec. 2000, p. 146, Rockaway, NJ.

Lisa Eccles, Device Bends Infrared Beams with Minimal Loss, Electronic Design, Dec. 18, 2000, pp. 36 & 38, Paramus, NJ.

Lisa Eccles, Researchers Use UV Light to Control the Size of Nanopores, Electronic Design, Dec. 18, 2000, pp. 36 & 38, Paramus, NJ.

Kathleen Richards, Interconnection in the metro for bandwidth trading, Lightwave, Jan. 2001, pp. 141-142, Rockaway, NJ.

R. Brad Kummer, Converge data and voice services? Not so fast. Lightwave, Jan. 2001, pp. 78, 80, 82 &84, Rockaway, NJ.

Hakim Dhilla, New Spatial multiplexing architecture keeps fiber networks truckin', Lightwave, Jan. 2001, pp. 153, 154, 156 & 158, Rockaway, NJ.

Dr. Gilad Goren and Eli Erlich, Ethernet in the wide area network, Lightwave, Jan. 2001, pp. 66, 65, 69 & 70, Rockaway, NJ.

Kanwar J.S. Chadha, PH.D., Optical networking is the link to global SANs, Lightwave, Jan. 2001, pp. 74 & 76, Rockaway, NJ.

John McIntosh, OCDMA Promises Disruptive New Metro Network Model, Fiberoptice Product News, Mar. 2001, pp. 114 & 116, Rockaway, NJ.

Mark E. Crovella and Azer Bestavros, Explaining World Wide Web Traffic Self-Similarity, Computer Science Department, Technical Report TR-95-015, Oct. 12, 1995, 24 pages. Boston Univeristy, Boston MA.

T. E. Darcie, "Subcarrier Multiplexing for Multiple-Access Lightwave Networks"; J. Lightwave Technol., LT-5(8):1103-1100, Aug. 1987.

A. Fumagalli et al., "A Token Based Protocol for Integrated packet and Circuit Switching in WDM Rings"; In Proc. Globecom '98, Australia, Nov. 1998.

R. Olshansky et al., "Multigigabit, Multichannel Lightwave Networks Using Subcarrier Multiplexing"; J. High Speed Networks, 2(1):63-79, Feb. 1993.

* cited by examiner

PRIOR ART

*PRIOR ART*

*PRIOR ART*

*PRIOR ART*

*PRIOR ART*

*PRIOR ART*

*PRIOR ART*

1300

*PRIOR ART*

(total N+1 channels)

| | A' | B' | C' | D' | E' |
|---|---|---|---|---|---|
| $C_7$ | 01 | 10 | 00 | 00 | 00 |

| | A' | B' | C' | D' | E' |
|---|---|---|---|---|---|
| $C_9$ | 01 | 01 | 10 | 00 | 01 |

| $C_7$ | Data Request For Movie |
|---|---|
| $C_9$ | Data Request For Tax Records |

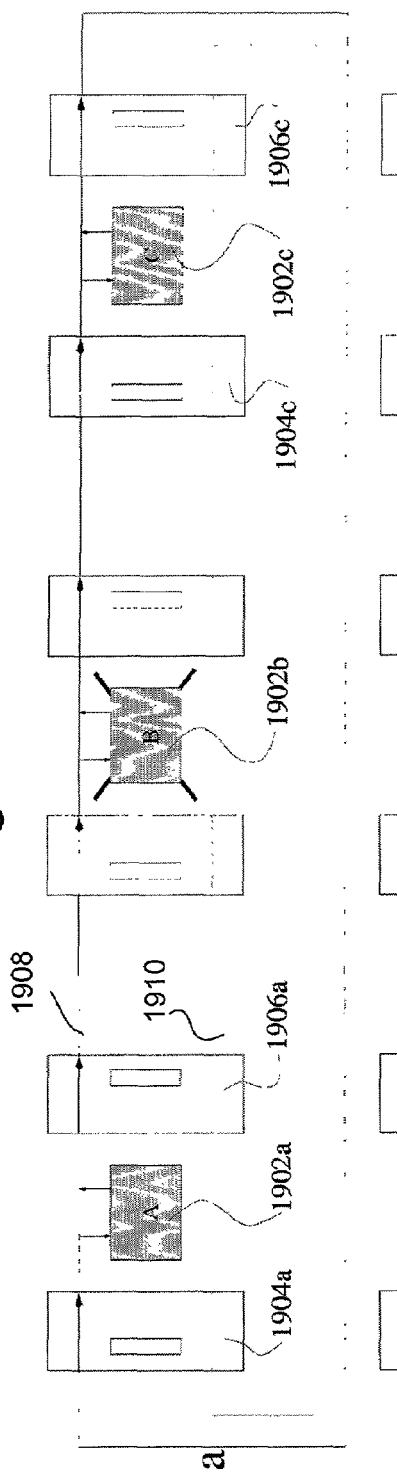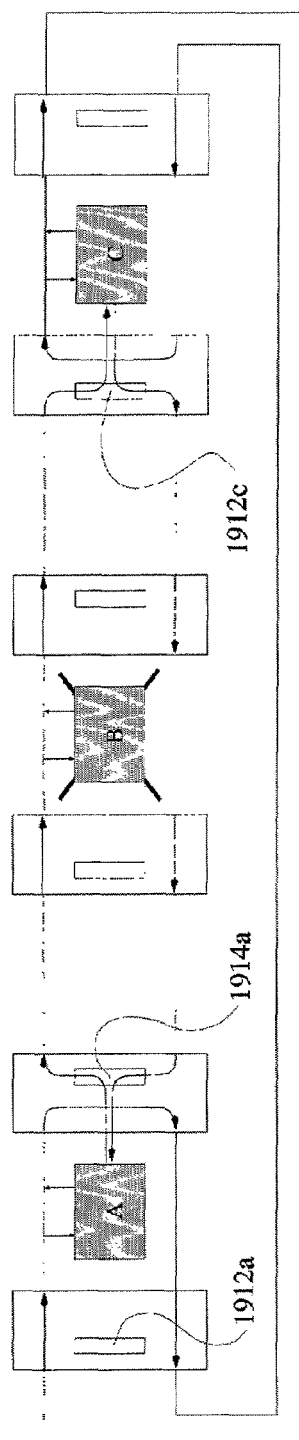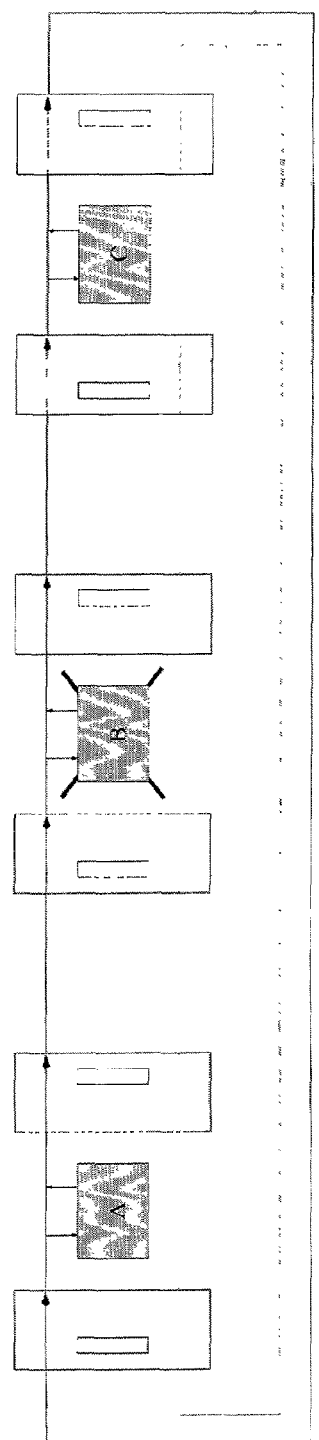
Figure 19
Fig. 19a
Fig. 19b
Fig. 19c

* All token fields not explicity overwitten are regenerated unchanged.

° If Node is OK, It Will First Segregate Bad Downstream Link and TX on Protection Medium. (Draw Figure of 3 Segments)
* Log all Events, Notify NMS
† May be Due to Fiber Cut on Upstream Link, May Be Due to Catastrophic Failure at Upstream Node. If the Former, Move to Bring Node Back Online.
‡ Control Channel Switch is Stuck.

DYNAMIC COMMUNICATION CHANNEL ALLOCATION METHOD AND SYSTEM

RELATED APPLICATION

The present invention is related to provisional application Ser. No. 60/282,318 filed on Apr. 6, 2001 and claim is made to this earlier filing date.

BACKGROUND OF THE INVENTION

1. Field of the Invention

The present invention relates to a fully distributed method of dynamically allocating bandwidth, as represented by communication channels, between various nodes in a network. Specifically, the method involves the use of a token of information for each available network communication channel ($C_1$ through $C_n$) wherein the token(s) are transmitted over a control communication channel ($C_0$). Each node looks only at the control channel tokens to determine if a data payload is destined for and simultaneously arriving at that node on one of the communication channels. The method and system are particularly useful in allocating bandwidth for "bursty" data traffic.

2. Abbreviations

A variety of abbreviations will be provided to aid the reader. This information may be applicable to the prior art, the present invention, or some combination of the two. No assumption should be made regarding the applicability of this information except as referenced within the applicable preferred embodiment description of the present invention as given later in this document.

The following terms and acronyms will be used throughout this document:

| | |
|---|---|
| ADM | add/drop multiplexer |
| BLSR | bi-directional line-switched self-healing ring |
| CIR | committed information rate |
| DCS | digital cross connect systems |
| payload | digital data transferred across a communications network |
| PPS | Path Protection Switching |
| PVC | permanent virtual circuit |
| SHR | self-healing ring |
| SONET | Synchronous Optical Network |
| WDM | wavelength division multiplex {-ed, -ing} |

3. Network Traffic And Data Sources/Sinks

Customers can access a network from a variety of locations. For example, a customer might enter a network from the Internet or a public switched telephone network (PSTN). That customer might request a transfer of data from a variety of sources. These sources might include a storage area network (SAN), a wide area network (WAN) or a local area network (LAN) that is also connected to the network. A number of network architectures have been developed to assist the transfer of data from such a source to such a sink.

A typical network architecture is shown in FIG. 1 (0100) and has one or more network nodes (0101, 0102, 0103, 0104) having primary (0111, 0112, 0113, 0114) and/or secondary (protective) (0121, 0122, 0123, 0124) communication data links. For purposes of the present application, the term communication channel shall be designated $C_i$ where i takes on any value from 0 to n. Each link, for instance link 0121, can include a number of communication channels ($C_0$ to $C_n$). Likewise, a communication path can be established from one node to another over these links via a given channel $C_i$.

While the present invention is particularly amenable to applications in situations where ring networks as illustrated in FIG. 1 (0100) are implemented with two or more nodes, it is also applicable to situations where point-to-point network communications are implemented. Additionally, while the focus of many preferred embodiments of the present invention concentrates on optical communications (including Synchronous Optical Networks (SONET) and associated topologies), the present invention is not limited to the use of optical fiber as the communication medium.

4. Unidirectional Path-Switched Ring (0200, 0300)

Referencing FIG. 2, a topology for a SONET ring called a unidirectional path-switched ring is illustrated (0200). This ring uses two optical fibers (0201, 0202) and is configured such that each fiber channel sends communications traffic in one direction such that the direction of communications is opposite between the two fibers (0201, 0202).

The network elements (0231, 0232, 0233, 0234) are generalized communication sources/sinks in this topology, and should be considered as such in the context of the present invention. The network interface modules (0211, 0212, 0213, 0214) generally represent a number of multiply redundant communication ports that permit multiplexing of received data from one of several ports in the event of a node or path failure. Multiplexing functions (0221, 0222, 0223, 0224) are generally performed electrically but may also be optically actuated. Note especially that SONET technology is a hop-by-hop system, where optical transmission is terminated at each node for electronic processing of every signal, and that the control and signaling information is in-band, i.e., the data frames themselves contain "overhead" information which is used for operations, administration, management & protection functions (OAM&P).

While the topology illustrated in FIG. 2 (0200) provides some insight into how data is transmitted from node to node during normal operation, the topology under link failure conditions in which a fallback/recovery mode of operation is activated may be seen in FIG. 3 (0300). Here the link failure has been introduced between two network interface units (0312, 0313). This failure prompts the network system management components to reconfigure the multiplexer switches (0321, 0322, 0323, 0324) to avoid the failing link if possible. Redirection of the receive data switch (0323) permits the network to recover from this condition and still permit transmit and receive connectivity to be maintained between all nodes in the network. This reconfiguration process is not instantaneous, however, and the network elements (0331, 0332, 0333, 0334) will experience some degree of latency during the crossover of the receive data switch (0323). Furthermore, while this topology provides for secondary (protective) communications backup capacity, it makes no provision for the idle bandwidth in these communication channels to be actively used by the network. Furthermore, SONET topology assumes that a given link is either "lit or "dark", meaning there is no provision for graceful degradation of a communication channel link in this paradigm.

5. Bi-Directional Line-Switched Self-Healing Ring (0400)

Another SONET ring topology that is widely used in the prior art is termed Bi-Directional Line-Switched Self-Healing Ring (BLSR) and is illustrated in the four-fiber ring of FIG. 4 (0400). In this configuration, some of the fiber is acting as stand-by (protection) (0411), in the event that the working fiber (0412) (or a node) fails. The protection copy (0411) becomes the working copy (0412) and traffic is diverted around the problem should a failure occur using the add/drop multiplexers (ADMs) (0401, 0402, 0403, 0404). As with all SONET approaches, this approach makes for a very robust system and provides high reliability, albeit at the increased cost of the addition of redundant fiber links (0411), and at the significant cost of electronic equipment, electrical power supply, footprint (space requirements) and air conditioning to process all data electronically at each node. Indeed, these drawbacks obtain with all current hop-by-hop, full optical-to-electronic-to-optical signal conversion approaches. Dynamic Communication Channel Allocation Method And System 6. Fault-Tolerant Switching Methods (0500)

Since optical fiber has a very large bandwidth and associated information carrying capacity, along with the capability of supporting a wide variety of simultaneous logical data connections, the loss of the fiber can be a serious event causing considerable disruption and economic loss. Two common approaches to solving this link loss problem are illustrated in FIG. 5 (0500).

One approach is called Line Protection Switching or 1:1 Switching (0501). This configuration (0501) consists of two point-to-point fiber pairs between two network elements (0521, 0522, 0523, 0524 and 0510). If the working fiber is lost or the signal degraded, the protection pair assumes the job of carrying the traffic between the network elements. In a fully protected system, this configuration requires four fibers (two transmit and two receive per network interface).

Another approach is called 1+1 Protective Switching (or Path Protection Switching (PPS)) in which the switching takes place at low speed or via control input to the network element (0502). With this arrangement, the traffic is sent on both the working and protective fibers. The two copies of the traffic are received at the receiving network element (0541, 0542, 0543, 0544 and 0530). Here, they are compared, and only the better copy is used.

An example of this methodology in action might configure a fiber to carry 48 channels with channels 1-24 dedicated for payload traffic and channels 25-48 used for protection. In the event one of the working channels is faulty, the receiving network element (0541, 0542, 0543, 0544 and 0530) will replace it with the other copy on the corresponding protection channel. This approach is quite fast and does not result in any loss of traffic. Problem restoration is quite efficient and the other 23 channels are not affected.

The concepts behind 1:1 and 1+1 protection have been generalized for DWDM networks to mean not just the point to point fiber pairs, but the aggregated links of the entire end-to-end lightpaths.

7. Path Protective Switching (0600, 0700, 0800)

FIGS. 6, 7 and 8 provides an example where a PSTN acts as part of the network. A central office of the PSTN can act as a node on the network. A typical path protective switching topology under normal operating conditions (0600) permits data to flow from the initial network interface (0622) through a good path to another network interface (0621), then through the central office (0610) to the telecommunications network.

Referencing FIG. 7, a typical path protective switching topology under node failure conditions (0700) permits data to flow from the initial network interface (0722) through an alternate path to another network interface (0723, 0724), then through the central office (0710) to the telecommunications network. Here since the node (0721) is down the signal is diverted to an alternate path by the upstream node (relative to the failed node (0721)).

Referencing FIG. 8, a typical path protective switching topology under link failure conditions (0800) permits data to flow from the initial network interface (0822) to a downstream node (0821) through an alternate path via network interface (0822) to another network interface (0823, 0824), then through the central office (0810) to the telecommunications network. Here since the path is down the signal is diverted by the downstream node (0821) (relative to the failed link).

In all these cases the shared protection ring can reconfigure and recover from a node or fiber failure. The switching necessary to achieve this functionality is generally implemented by multiplexer configurations similar to that illustrated in FIGS. 2 and 3 (0221, 0222, 0223, 0224, 0321, 0322, 0323, 0324).

8. Path Protection Ring Recovery Operations (0900, 1000)

Path protection switching (PPS) is generally achieved by using fields in the transmission overhead headers. In other words, the transmission specific information, i.e. destination node information, is included in each frame of data. As illustrated in FIG. 9 (0900), during normal operations of a 1+1 protection scheme, signals are placed on both fibers (0901, 0902) so that the protection fiber (0901) carries a duplicate copy of the payload, but in a different direction, and as long as the signals are received at each node on these fibers (0901, 0902), it is assumed all is well.

When a problem occurs, as illustrated in FIG. 10 (1000), such as a fiber cut between nodes B (1020) and C (1030), the network changes from a ring (loopback) network to a linear network (no loopbacks). In this example (1000), node B (1020) detects a break (1003) in the fiber, and sends an alarm to the other nodes on the working fiber (1002). The effect of the signal is to notify node C of the problem. Since node C (1030) is not receiving traffic on the protection fiber from node B (1020), it diverts its traffic onto the fiber. Node B (1020) then uses the protection fiber (1001) for this traffic.

9. "Bursty" or Self-Similar Data Traffic

There is a significant difference between voice and data traffic. Voice traffic, such as telephone calls between voice network subscribers, can be very accurately modeled. This allows network planners to more easily size the capacity of a voice network infrastructure. In contrast, modem data communication traffic is far more bursty" (self-similar) than previous data traffic, in that there is more temporal self-information associated with the data than in the past. The difference between bursty and non-bursty traffic is shown in FIG. 11. Voice traffic (1102) appears bursty over very short time frames (1110). However, as the time frame increases or there is an aggregation of multiple channels of voice traffic, the data rate (1112) shown on the y-axis becomes smoother. In other words, there are fewer peaks that exceed the average aggregated data rate. However, data traffic (1104) is bursty in both short and long time intervals, and remains bursty even when aggregated with other data channels. A useful statistic in appreciating this phenomenon is that, in data networks, such as Ethernets, the peak load may often exceed the average load by a ratio of 100:1 or more. A network with statically allocated capacity that is not designed to handle the extreme peaks of the bursty traffic will not be able to throughput those peak data loads efficiently. However, designing a network that can handle even the greatest peak data rate is overly expensive and underutilized during non-peak traffic. Therefore, a need exists for a method of dynamically allocated bandwidth to handle peak data rates.

Traditional models associated with the telecommunications industry have placed both a premium and a limit on the self-information (burstiness, or ratio of peak load to average load) associated with a variety of frame relay transmission schemes. These scenarios are best summarized in the VOICE & DATA COMMUNICATIONS HANDBOOK by Regis J. Bates and Donald W. Gregory (2000, ISBN 0-07-212276-5, page 642) as follows:

"When designing a frame relay service, the speed of access is important both prior to and after installation. The customer must be aware of the need for and select a specified delivery rate. There are various ways of assigning the speed from both an access and a pricing perspective. For small locations, such as branch offices with little predictable traffic, the customer might consider the lowest possible access speed. The frame relay suppliers offer speeds that are flat rate, usage sensitive, and flat/usage sensitive combined. The flat-rate service offers the speed of service at a fixed rate of speed, whereas the usage-based service might include no flat-rate service, but a pay-as-you-go rate for all usage. The combined service is a mix of both offerings. The customer selects a certain committed information rate (CIR). The committed information rate is a guaranteed rate of throughput when using frame relay. The CIR is assigned to each of the permanent virtual circuits (PVC) selected by the user. Each PVC is assigned a CIR consistent with the average expected volume of traffic to the destination port. Because frame relay is a duplex service (data can be transmitted in each direction simultaneously), a different CIR can be assigned in each direction. This produces an asymmetrical throughput based on demand. For example, a customer in Boston might use a 64 Kbps service between Boston and San Francisco for this connection, yet for the San Francisco-to-Boston PVC a rate of 192 Kbps can be used. This allows added flexibility to meet the customer's needs for transport. However, because the nature of LANs is that of bursty traffic, the CIR can be burst over and above the fixed rate for 2 seconds at a time in some carriers' networks. This burst rate (Br) is up to the access channel rate, but many of the carriers limit the burst rate to twice the speed of the CIR. When the network is not very busy, the customer could still burst data onto the network at an even higher rate. The burst excess rate (Be) can be an additional speed of up to the channel capacity, or in some carrier's networks it can be 50 percent above the burst rate. Combining these rates, an example can be drawn as follows:

Total Throughput=$CIR+Br+Be$

320 $Kbps$ total=128 $Kbps$+128 $Kbps$+64 $Kbps$"

Thus, while the prior art permits an increase in the overall data transfer rate for short periods of time, what is not taught is any method to dramatically increase the apparent system throughput by pooling the capacity of all of the avialable communication channels, utilizing this as a resource for additional bandwidth, and allocating bursts of bandwidth to match the bursts of demand, while still maintaining protection and fallback mechanisms.

10. Network Design and Planning

The prior art (see TELECOMMUNICATIONS ENGINEER'S REFERENCE BOOK by Fraidoon Mazda (1998, ISBN 0-240-51491-2, page 22/13)) teaches that "The first consideration when specifying any data communications network is to establish the nature and rates of traffic which the network will be expected to support both in the short and the long term. This is crucial to all network design and is the starting point of all network decisions. If errors are made here, the network cannot be expanded to meet new (and possibly unexpected) requirements."

Thus, the prior art teaches that proper planning with foresight to the future is necessary to properly design a modem communications network. However, the real problem with this philosophy in modem networks is the exponential increase in demand for bandwidth that is currently being experienced by the telecommunications industry. For example, FIG. 12 illustrates the projected growth curves (1200) being by Internet data traffic (1202). Note that the improvements in SONET capacity using time division multiplexing (TDM) (1204) is not pacing data demand. Likewise, FIG. 13 shows the projected growth rate in processing capacity (1300) of nodes in data networks. To further emphasize the exploding growth rates in data traffic, please note that the y-axis in FIGS. 12 and 13 are logarithmic. Planning in such an environment is difficult if not impossible. Couple the increased demand for bandwidth with the inherent bursty nature of the data being transmitted, and this further aggravates an already worrisome problem.

Mazda goes on to distinguish various types of data communications traffic as follows:

1. Stop-start traffic in the form of lots of short packets traveling in one direction often with slightly longer packets in the reverse direction. A characteristic of this type of traffic is that it is often associated with a requirement for very short turn-around and transit delays (e.g. word-processing). This is a classical form of asynchronous traffic.
2. 'Forms' traffic where a small amount of data travels in one direction on an ad hoc basis, but it is answered with a stream of traffic in the other direction (database enquiry, web server request).
3. Block mode traffic, where there is a stream of large full packets traveling in one direction with short packets traveling in the other (file transfer).
4. Transaction traffic where there are high numbers of calls with limited data transfer, often done with the Fast Select facility (e.g. credit card checks, holiday booking lounges).
5. Optimized traffic, where many users are sharing a single connection (often using a Transport connection). Optimization is achieved by filling the packets as full as possible without degrading the class of service below the user requirements (OSI).
6. Priority traffic. This may be any of the traffic types described above but takes precedence over the normal data flowing in the network.
7. Management traffic, which is an overhead in any network.
8. Multimedia traffic, such as video.
9. Compressed voice traffic.

A corporate or public data network would handle all these types of traffic (and more). Most small private networks will only have one or two types of traffic and are often designed and tuned to those specific requirements. The list above is not intended to be comprehensive, but to give an idea of the differing traffic types that exist.

11. Fumagalli'S WDM Method

In "A TOKEN BASED PROTOCOL FOR INTEGRATED PACKET AND CIRCUIT SWITCHING IN WDM RINGS," by A. Fumagalli, J. Cai, and I. Chlamtac, published in Proceedings of Globecom 1998, in a wavelength division multiplexed ring 1400 of C channels, N nodes, and N optical links, there are C-1 data channels, and 1 token (control/signaling) channel. The C-1 tokens each represent a single data channel, and all tokens circulate on the token channel, which is terminated at each node. Each token consists of N bits; and advertises the availability of each optical link for its particular wavelength channel by a 0 to represent availability, and a 1 to represent being in use. At each node, the data channels are optically demultiplexed, and passively tapped for possible reception.

FIG. 14 illustrates a node (1400) under the Fumagalli scheme. For each of the C-1 data channels, the node has one fixed transmitter (1402), one fixed receiver (1404), and one on/off optical switch (1406). For ease of illustration, only four data channels are shown here. But today, on the order of a hundred wavelength channels are multiplexed per fiber, and this number is increasing very rapidly.

The on/off switches are used to control the flow of optical signals through the node, and can prevent the circulation of "spent" packets in the ring. The optical delay line (1408) at each node is used to delay the data transmission, giving the node enough time to process the control packet (token). The information on the control channel (1410) is handled by a controller (1412). A buffer of sufficient size is provided at each node for data processing (1414) to queue incoming (internetwork) transmissions prior to their transmission into the ring (intra-ring) and outgoing (extranetwork) transmissions prior to their transmission out of the ring. Though this design is somewhat similar to IEEE 802.5 token ring and FDDI (Fiber Distributed Data Interface), the simpler station management and, especially, the simpler out-of-band traffic control are much more suitable for high-speed WDM transmission.

Using this scheme, a node that has data to transmit simply claims the available communication path, sets the appropriate fields in the token (if a link is to be claimed for a communication path, the bit corresponding to that link is set to 1 to reflect this), and releases the token and the data for transmission downstream simultaneously. The node does not need to check with the other nodes or any central authority. The destination node receives the token on the token (control) channel while the data is delayed on the data delay loop (1408), monitors the receiver that taps that channel to receive the data, and opens the ON/OFF switch (1406) on that channel to prevent interference downstream, and thereby "clean up" that data channel. Meanwhile, upon completion of its transmission, the source node waits for the token to return and then regenerates the token, clearing the fields corresponding to its communication path. This protocol is fully distributed, i.e., there is no central network controller.

12. Objects of the Invention

Accordingly, the objects of the present invention are, among others, to circumvent the deficiencies in the prior art and affect the following objectives:

(1) To increase the capability of supporting multi-channel communications mediums, such as WDM, DWDM, and U-DWDM (ultra-DWDM).

(2) To provide support for data communication payloads that are bursty and/or fractal and/or which have high degrees of self-similarity and/or long-range dependence (these terms are used as near synonyms).

(3) To permit existing communication networks the ability to handle increasing bandwidth demands without the need for dramatic expansion.

(4) To operate undisturbed in the presence of certain node failures, without invocation of automatic protection switching, and its attendant increased transmission latency.

(5) To allow an easier recovery from an automatic protection switching invocation.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

SUMMARY OF THE INVENTION

The present invention relates to a fully distributed method of dynamically allocating bandwidth between various nodes in a network. Specifically, the method involves the use of a token of information for each available network communication channel ($C_i$, i is one of 0 through n) wherein the token(s) are transmitted over a control communication channel ($C_O$). Each node looks only at the control channel tokens to determine if a data payload is destined for and simultaneously arriving at that node on one of the communication channels. The method and system are particularly useful in allocating bandwidth for "bursty" data traffic.

The present invention also teaches a 1:1 (see section 5, p. 6 above), general protection architecture with no central controller, therefore fault tolerance must be fully distributed. If something is wrong with a node or a link, it must be detected and recovery done in a distributed way; and when a failed node/link is ready to come back online, distributed restoration is required. Three kinds of equipment faults may occur in the network in this system:

1. a node fails completely, perhaps severing the ring;
2. a link fails completely, severing the ring; or
3. a node is functioning incorrectly without severing the ring.

The purpose of the present invention is to enable protection and restoration of the network in the face of fault conditions such as node or link failures, allowing physical protection and restoration of traffic routes, and in-service reset of network physical topology after repair or replacement of failed nodes or links, also enabling deliberate offline service of network elements and/or insertion or deletion of nodes, with minimal interruption of traffic. The present invention is enabled by implementing certain architectural features and protocols at all nodes in the network.

One preferred commercial application for the present invention is in the construction of optically switched, out-of-band controlled, data communications network elements. The invention makes the token method of out-of-band control practical in terms of wavelength reuse. A data communications network of such elements offers greatly reduced cost and increased flexibility of data transfer.

Currently, service provider traffic is about 50% voice and 50% data. By the early part of this decade, studies show that data will account for as much as 96% of service provider traffic, doubling every nine months. With this exponential increase in network traffic loads, it is widely believed that the time has come for applying wavelength division multiplexing (WDM) to metropolitan area networks (MANs); and even to access networks and/or campus networks. Unlike the longer-term stability seen in the traffic load in WANs and core networks, due at least partially to the current practice of manual setup of expensive leased connections, it is nearly impossible to foresee the traffic load or traffic pattern in MANs and access networks. To utilize the capacity efficiently, dynamic bandwidth on demand (BoD) becomes a very important consideration in optical MANs. However, existing methods are at best web-based "point-and-click" (analogous to "switchboard operator") provisioning, and more often manual ("truck roll") provisioning, which need at least minutes (more often days, weeks, or months) to establish communication paths, and thus cannot meet the challenge of the bursty traffic in MANS. Burstiness (self-similarity) is a fundamental characteristic of this data traffic. Since connections that are big enough to handle the transient peak loads (bursts) of data traffic are empty most of the time, current optical solutions carry data on networks (which were designed for voice) that exhibit extreme underutilization.

With the most advanced systems today, the physical delay involved in communication path setup and tear-down (actual switching latency) is on the order of at least ten milliseconds. To support microsecond-scale communication path setup and tear down, as well as efficient fault tolerance and cost-effectiveness, a new system for supporting high-speed WDM optical transmission is required. Existing metro/regional systems are overwhelmingly based on the ring topology, due to familiarity and carrier comfort stemming from the long-standing adoption of SONET rings, and the survivability and speed of recovery available from WDM self-healing rings (SHRs). A single ring topology is considered here. Such a ring can be a subset of a larger network, or it can be a self-contained network. Since there is still no method that can handle optical packets "optically" (i.e., without re-conversion to electronics for routing, switching, and other processing) it is widely believed that for the near- and mid-term, methods belonging to one of the following two classes must be used:

1. packet switched transmission, based on optical-electronic-optical (OEO) conversion; and/or
2. circuit switched transmission, where many data packets are multiplexed onto the same underlying circuit (or virtual circuit, or sub-rate multiplexed circuit).

The first class of methods can provide users and operators the comfort of familiarity (since the information is converted into electronic domain at each hop for possible processing, monitoring, etc.). However, OEO conversion itself can be a bottleneck, requiring very costly high-speed elements, a large footprint, high energy consumption, special air conditioning, etc. Methods belonging to the second class can overcome these shortcomings, but do not support bursty traffic.

The methods taught by the present invention belong to the second class. To overcome the drawbacks of the methods belonging to this class, burst switching is implemented within this system, allocating "ephemeral" (extremely short-lived) circuits to carry bursts of packets.

BRIEF DESCRIPTION OF THE DRAWINGS

For a fuller understanding of the advantages provided by the invention, reference should be made to the following detailed description together with the accompanying drawings wherein:

FIGS. 19a to 19c illustrate the APS steps involved when a node fails but leaves the working fiber operable;

DESCRIPTION OF THE PRESENTLY PREFERRED EMBODIMENT

Figure 15:
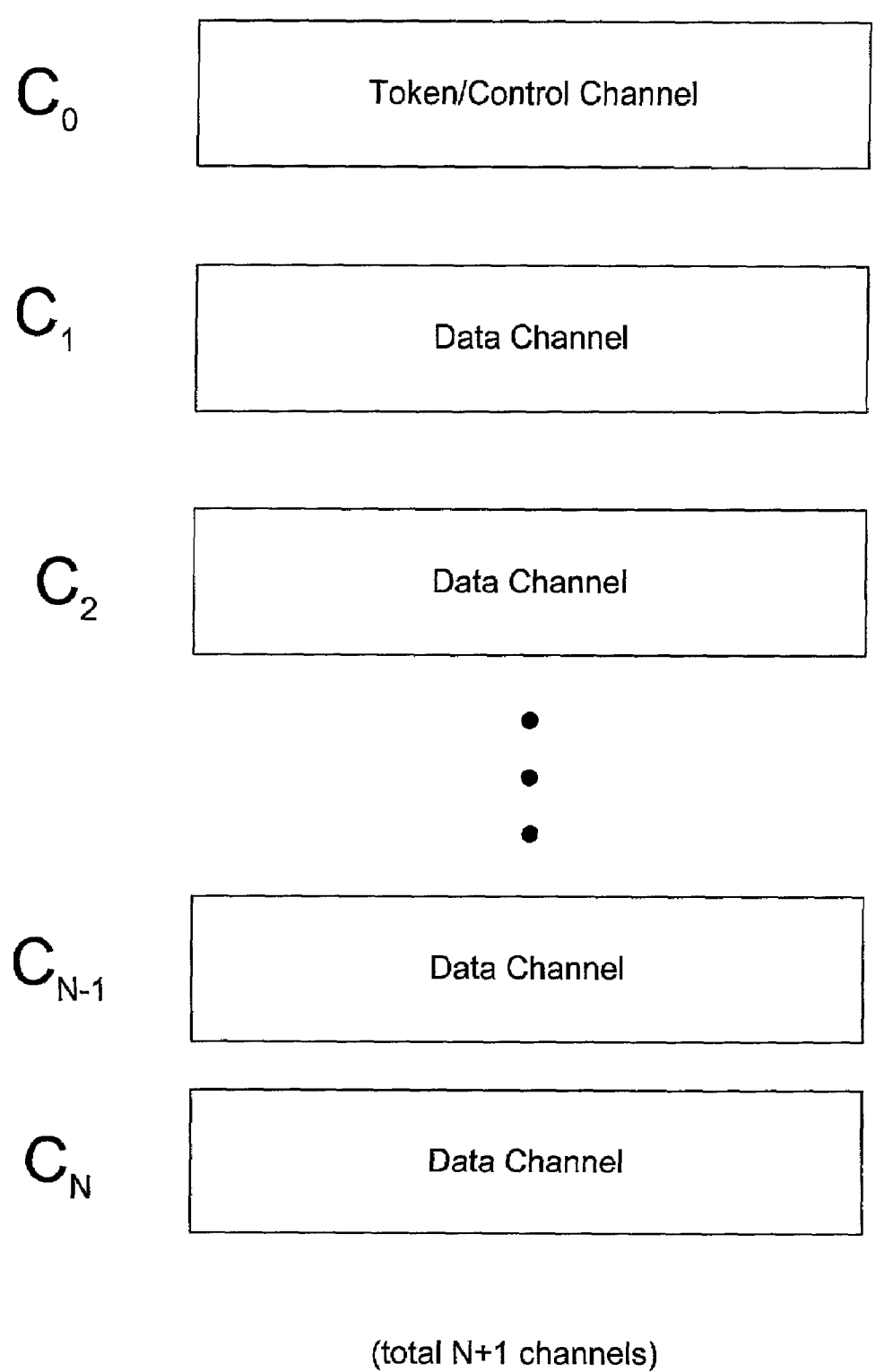
FIG. 15 provides a block diagram showing the distinction between the various commuincation channels.

The teachings of the present invention build on ideas and architecture, described in """"A Token Based Protocol For Integrated Packet and Circuit Switching in WDM Rings,"""" by A. Fumagalli, J. Cai, and I. Chlamtac, published in *Proceedings of Globecom* (Conference on Global Communications), 1998. However, in contrast to their simpler one-bit per link token, the present invention expands the functionality of the token. Referring to FIG. 15, each link can carry a plurality of communication channels ($C_0$ to $C_n$). One channel, $C_0$, is reserved as a control channel while the remaining channels $C_1$ to $C_n$ are used to carry data payloads. Each data payload channel has a token that is carried on the control channel and identified to the specific data channel. For a fiber optic network, each channel might correlate to a specific wavelength in a WDM medium.

1. Token Innovation

Figure 16A:
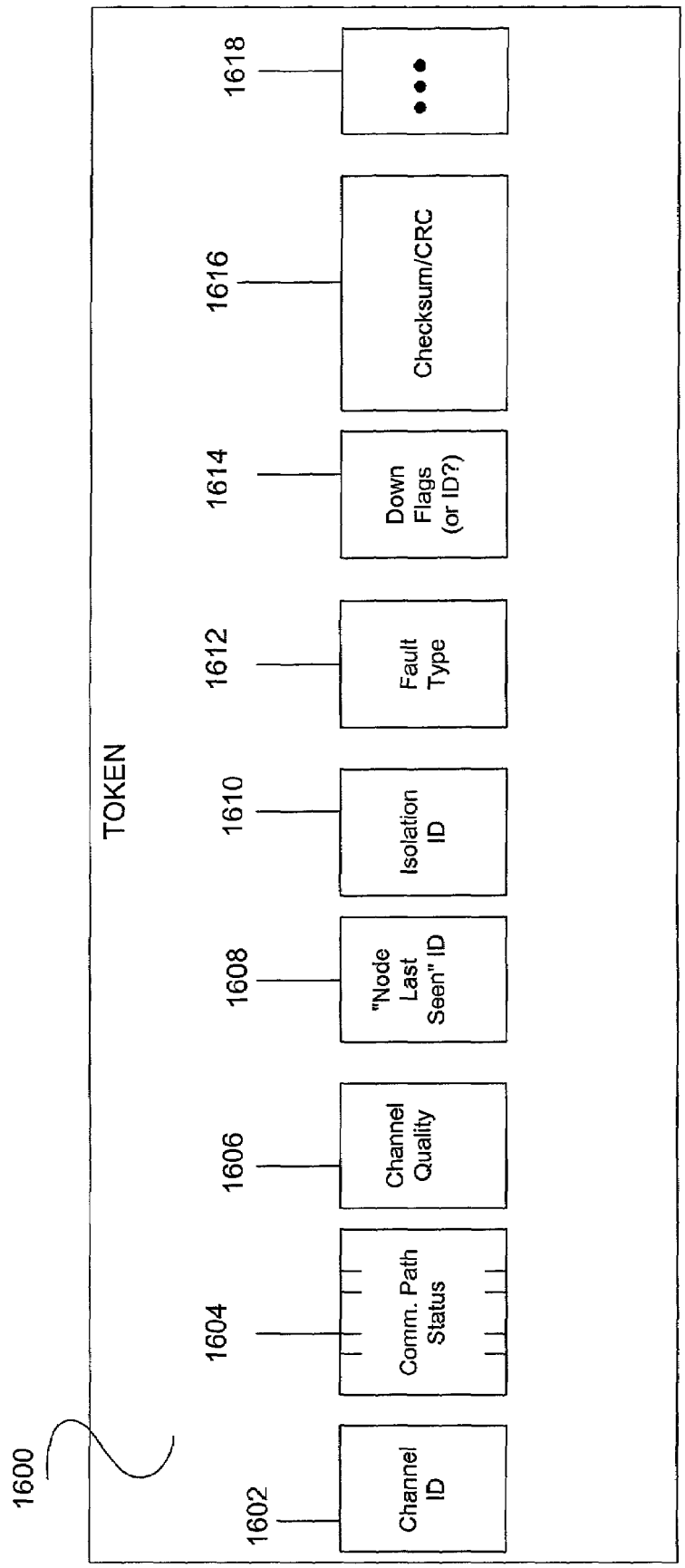
FIGS. 16a to 16d provide a comparison between the phyical topology of a network and the token fields.

FIG. 16a illustrates one embodiment (1600) of the present token scheme. The token (1600) can comprise a number of fields. For example, the first field (1602) can be a channel identifier. The channel identifier might be a two-bit or greater field. A second field (1604) can be a channel path status indicator. This field comprises a plurality of two-bit sub fields. The number of sub fields is equal to the number of links in the network. The data in the sub fields is used to advertise available bandwidth, active transmissions, sources, and sinks.

Figure 16B:
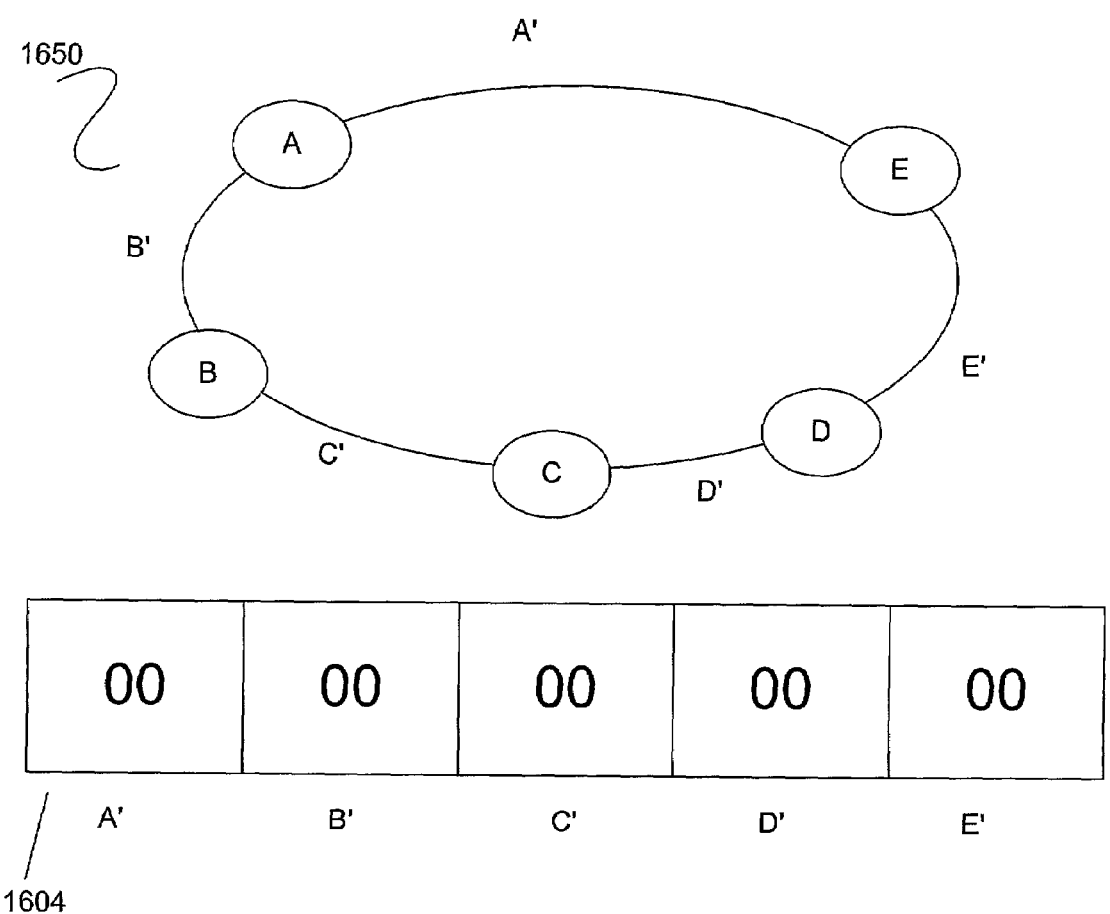

The correlation between the physical topology of the network and the field (1604) is better illustrated in FIG. 16b. An example network (1650) is shown having five nodes, designated A, B, C, D, and E. Further, a link is shown between each adjacent pair of nodes on the ring network. The links are designated A', B', C', D' and E'. Hence there are five links, there are five two-bit subfields in token (1604). With no data sources or sinks, each subfield is set to a default value (00).

Four values for the two-bit subfield exist: (00), (01), (10), and (11). The value (00) means that the corresponding link is currently available. In other words, the communication channel corresponding to that token is available to be used between this node and the next. A value of (01) means that the link associated with that subfield is either a "source link" or an "intermediate link". In other words, a link designated (01) is is always downstream from the source node of the data transmission and is not the destination node. The value (10) means that the corresponding link is a "destination link". In other words, the node immediately downstream from the link so designated is the destination for the data transmission. Finally, the designation (11) means that the link is the only link between the source of the data transmission and its destination (a one-hop communication path).

Figure 16C:
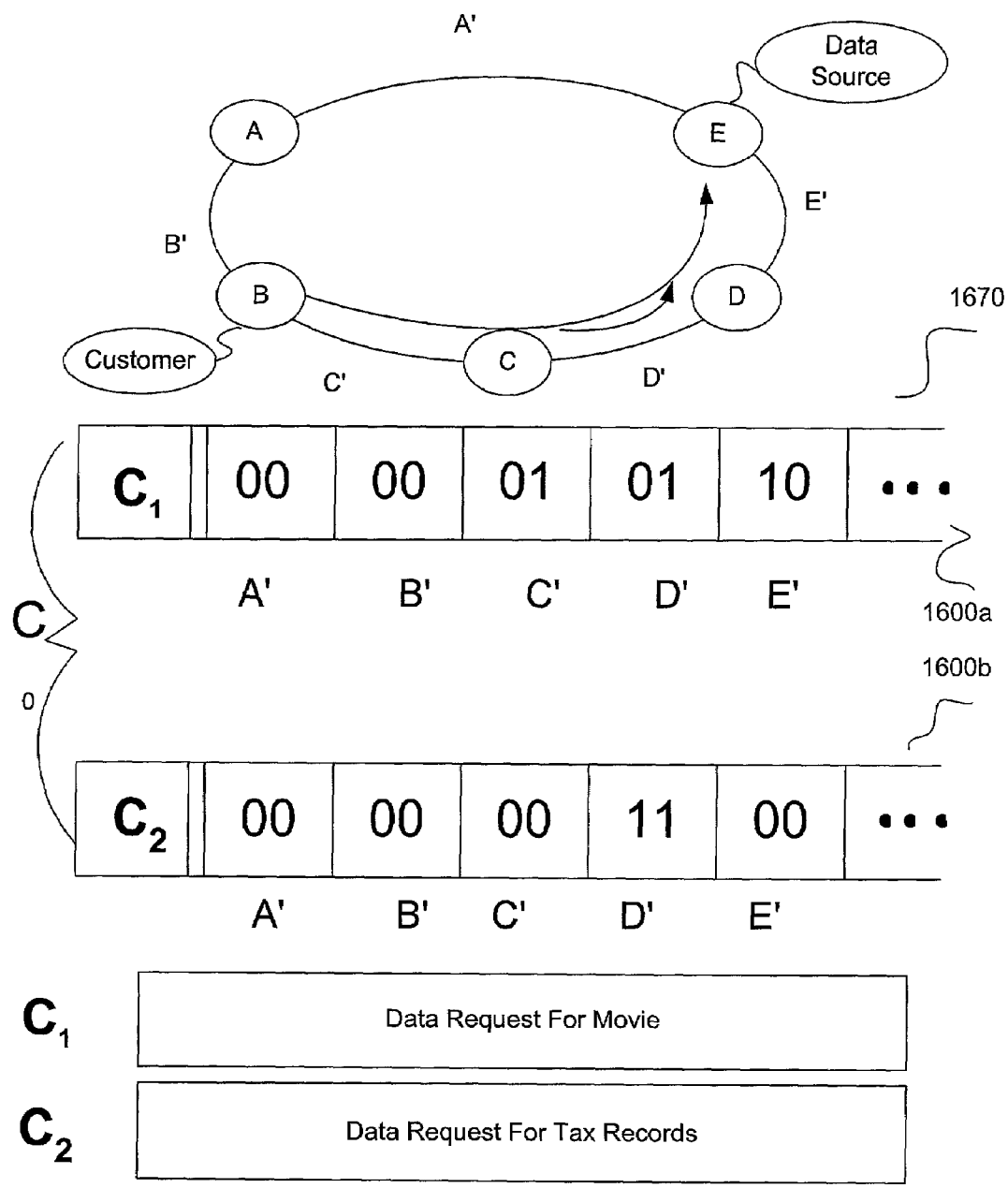

FIG. 16c provides an illustration tying the physical ring network to the tokens on the control channel $C_0$. In this example, there are again five nodes on a ring network and five links. A customer linked to node B makes a request to download a movie from a SAN connected to node E. At the same time, another customer on node C wants to request the last five years of its corporate tax records from its accountant located on node D. The tokens for channels 1 and 2 ($C_1$ and $C_2$) would be rewritten at nodes B and C respectively, as shown. These two tokens would be transmitted on the control channel $C_0$. In this example, the two tokens (1600a, 1600b) are shown having fields (1602) designating a channel and (1604) showing the link availability.

For the first request, a token (1600a) designated communications channel $C_1$ as carrying the customer request. Further, token (1600a) also has five subfields, each corresponding to the five links in the network. Since node B is the source of the data request, the subfields for links C' and D' are designated (01) while the subfield for link E' is designated (10). When node E reads this token, it will know to look at channel $C_1$ for the data request.

For the second request, a second token (1600b) is rewritten at node C so that the subfield for link D' is (11). Further, channel field (1602) is provided a value for communication path $C_2$. Thus, when node D reads this token (1600b), it will know to look at channel $C_2$ to the second data request.

Figure 16D:
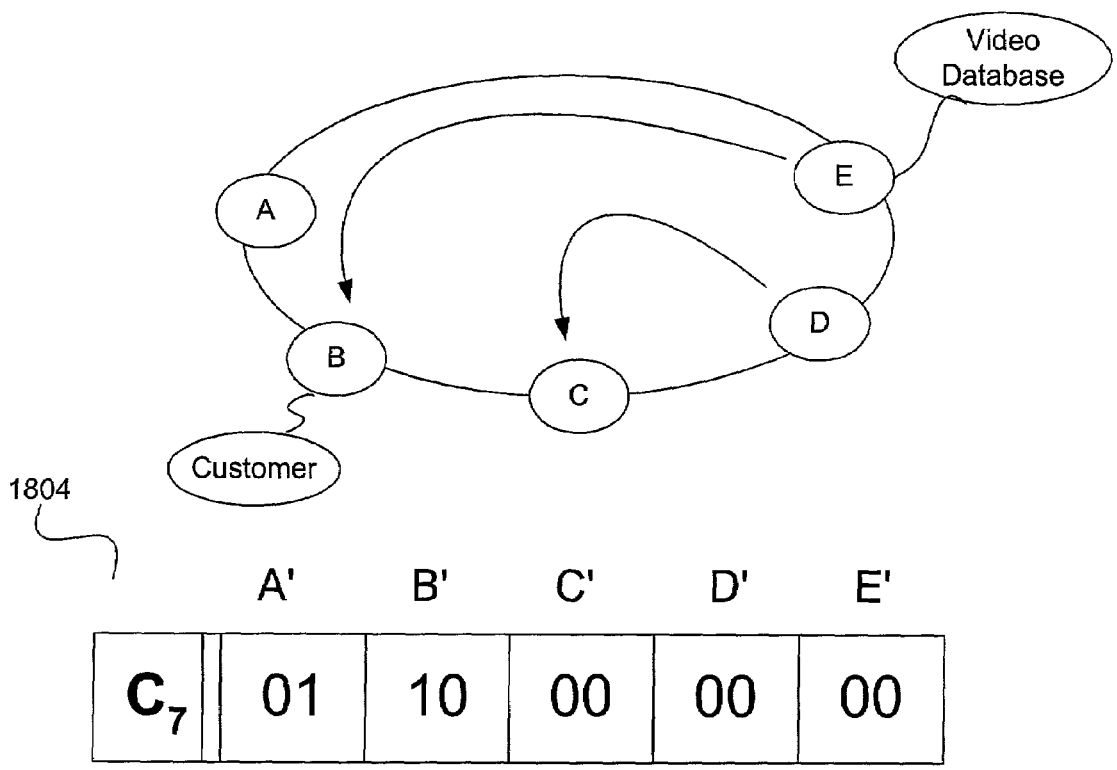

Referring now to FIG. 16d, the recipients of the data requests at nodes E and D, respectively, have transmitted the requested data back to the network and to the requesting customers. While it is typical that the requested data would reenter the network at the initial destination nodes, this is not invariant. In other words, the requested data may reenter the network at a different node. For simplicity, our example will have the data reenter at the initial destination nodes. However, the data providers are now the source and the customers are the destinations or sinks. Therefore, on the control channel, an available data channel, for example $C_7$, is identified by node E by reading the tokens. Node E then rewrites the token for $C_7$ to designate that node B is the destination for the movie data located on channel 7. Thus, the subfield for link A' will be (01) and the subfield for link B' will be (10). When node B reads this token, it will look to $C_7$ for the movie data. Likewise, the request for tax records received at node D can be transmitted back on channel 9. Thus the token for $C_9$ is altered at node D so that subfields for links E', A' and B' will be (01) and the subfield for link C' will be (10).

Figure 16E:
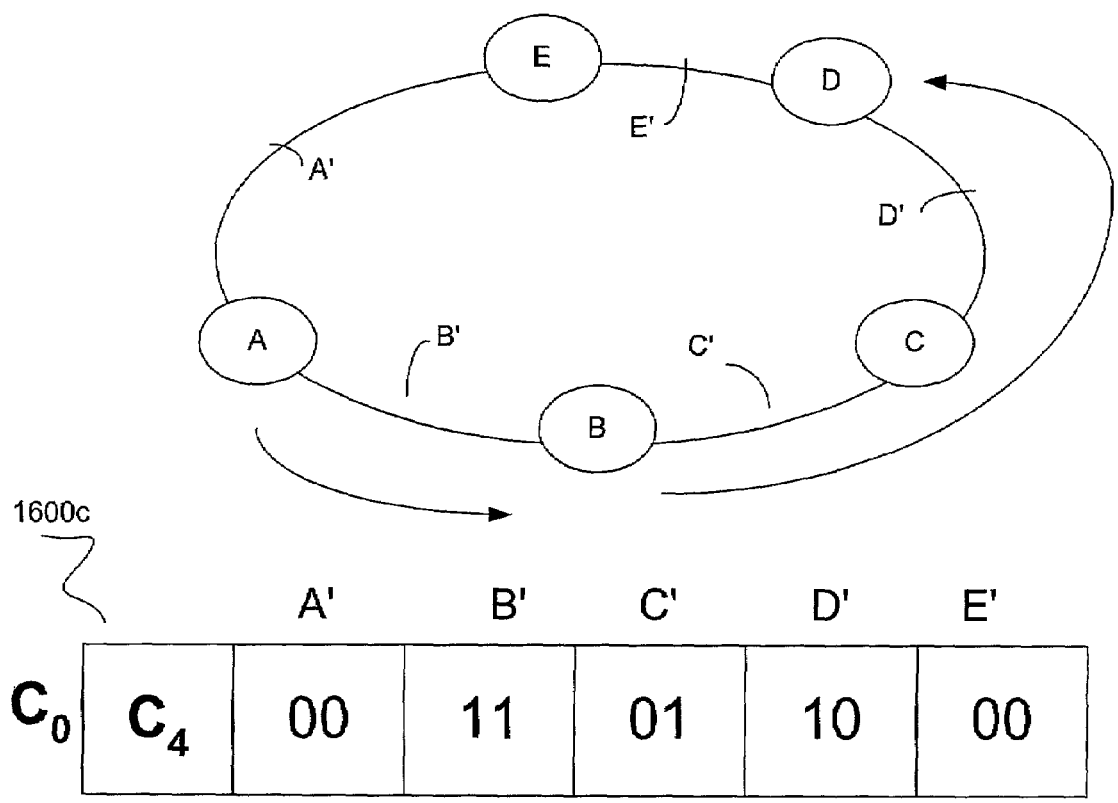
FIG. 16e compares a token embodying the present invention and a prior art Fumagalli style token.

Note that a node may terminate a communication path from upstream and be the source for another communication path on the same communication channel, simultaneously. Unlike Fumagalli, the present invention's use of an expanded token allows the same channel to be used by non-overlapping contiguous portions of the network simultaneously. For example, FIG. 16e illustrates the scenario where two separate data transmissions are sent over the same channel simultaneously. A first request is sent from node A to node B, while a second request is sent from node B to node D. The token (1600c) for the present invention would designate the subfield for link B' as (11). Likewise, the subfield for link C' would be a (01) and the subfield for link D' would be (10). Fumagalli's token would only have a (1) (1) (1) value for the subfields associated with links B' C' and D' respectively. Thus, node C, when reading a Fumagalli style token would not be capable of distinguishing whether it should pass the data transmission on further or read it as the destination node.

2. Protection Methodology Overview

The token innovation described above allows the network to simultaneously use the same communications channel for two separate non-overlapping contiguous portions of the network. The token, shown in FIG. 16a also has fields to assist in the protection of the data transmission when the network is damaged. These token fields are used when the network architecture also provides a protection fiber that provides an alternate route to the network nodes.

The protection fields shown in the token in FIG. 16A (1606, 1608, 1610, 1612, 1614, 1616) can be used or can simply be reserved space in the token. For example, the token (1600) can include a channel quality field (1606) that could provide some information on the quality of the link between two nodes or the quality of a single channel around the entire ring. An algorithm could even be implemented that ensured that a data transmission was only routed on the highest quality channel on the network, for a premium price. The "node last seen" field (1608) is another protection field and could be used to verify the correct functioning of the adjacent upstream node. An "isolation ID" (1610) is a field that can be included to list the node that are of questionable quality. It is used as a signal to the node upstream of the suspected faulty node. A "fault type" field (1612) can contain one of several values, indicating either no fault, fiber cut, malformed token, incorrect token, two tokens for the same channel, or unexpected node last seen ID. A "down flags" field (1614) can indicate a node that is out of service. Finally, a checksum field (1616) can be used to verify the integrity of the token. Further, additional token fields (1618) may be reserved for future needs.

Figure 1:
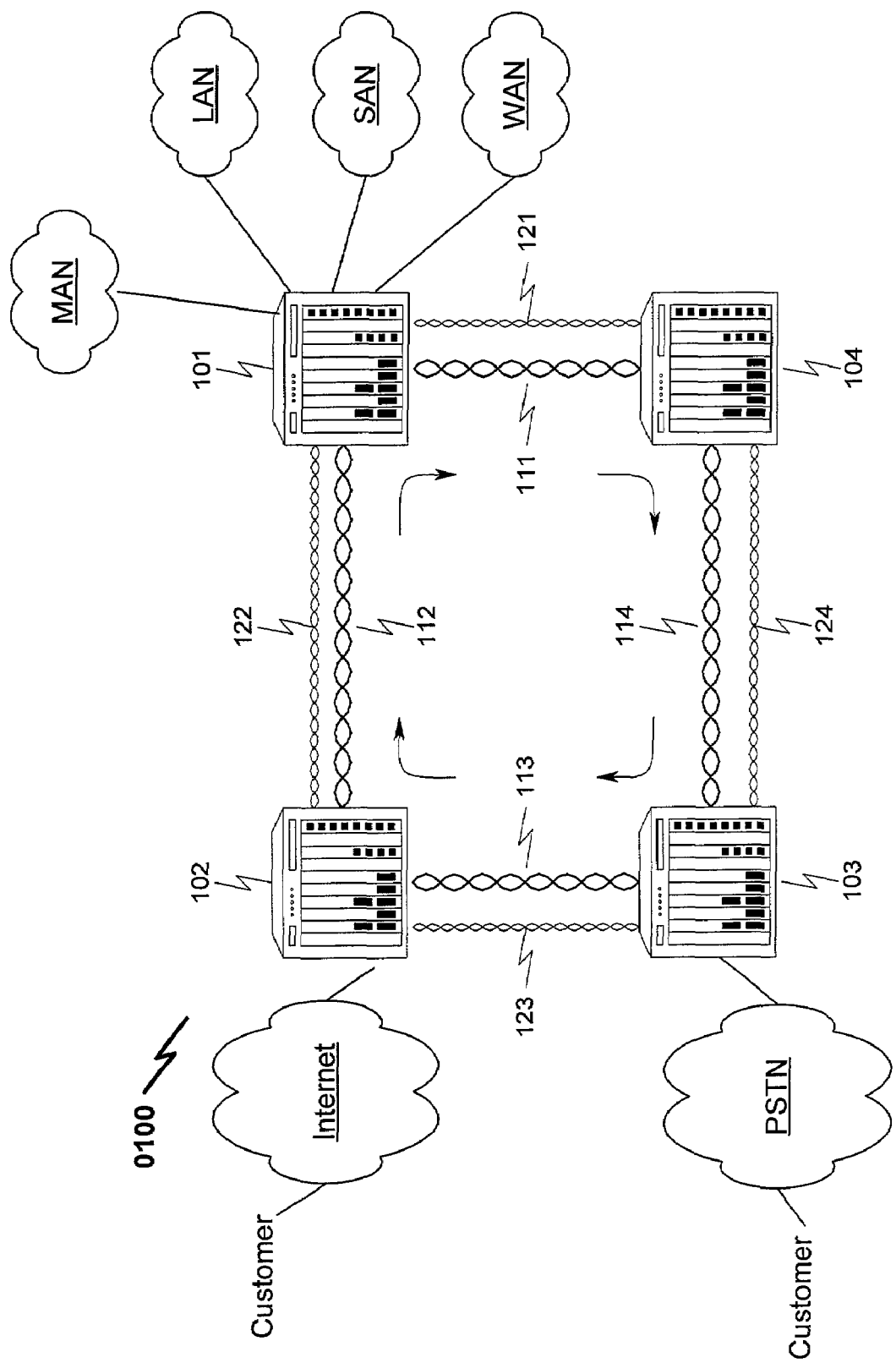
FIG. 1 illustrates a standard network architecture in which the present method can operate.
Figure 2:
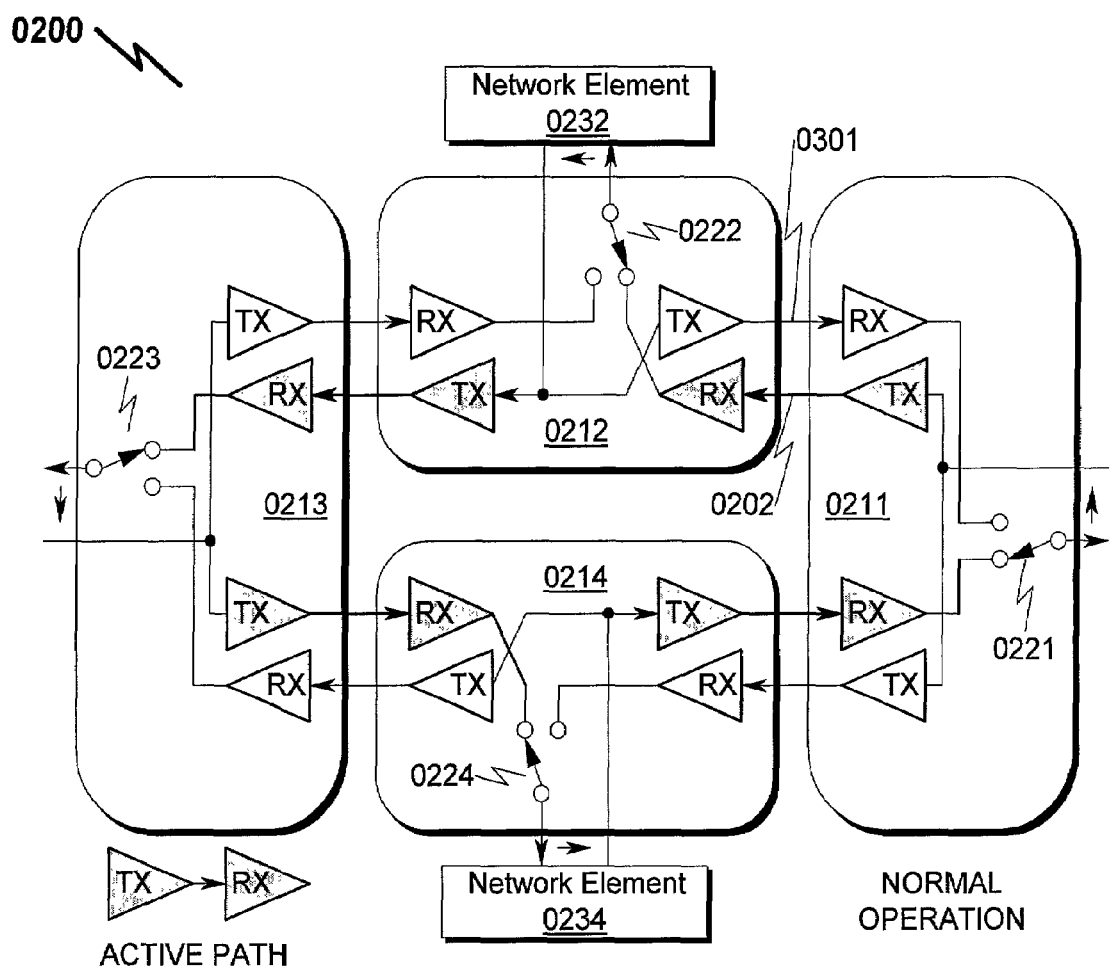
FIG. 2 illustrates a prior art unidirectional path-switched ring under normal operating conditions.
Figure 3:
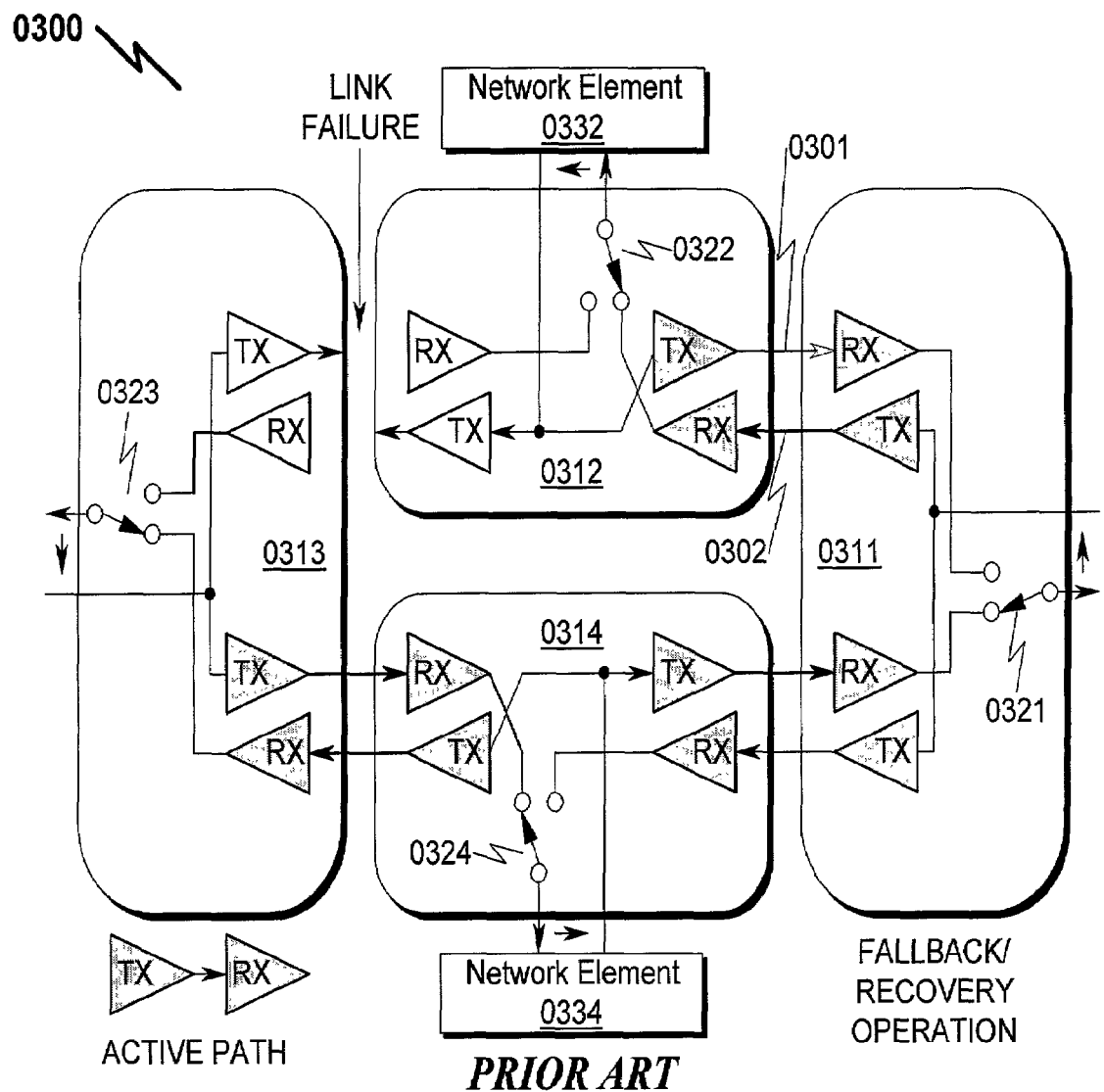
FIG. 3 illustrates a prior art unidirectional path-switched ring under link failure conditions.
Figure 4:
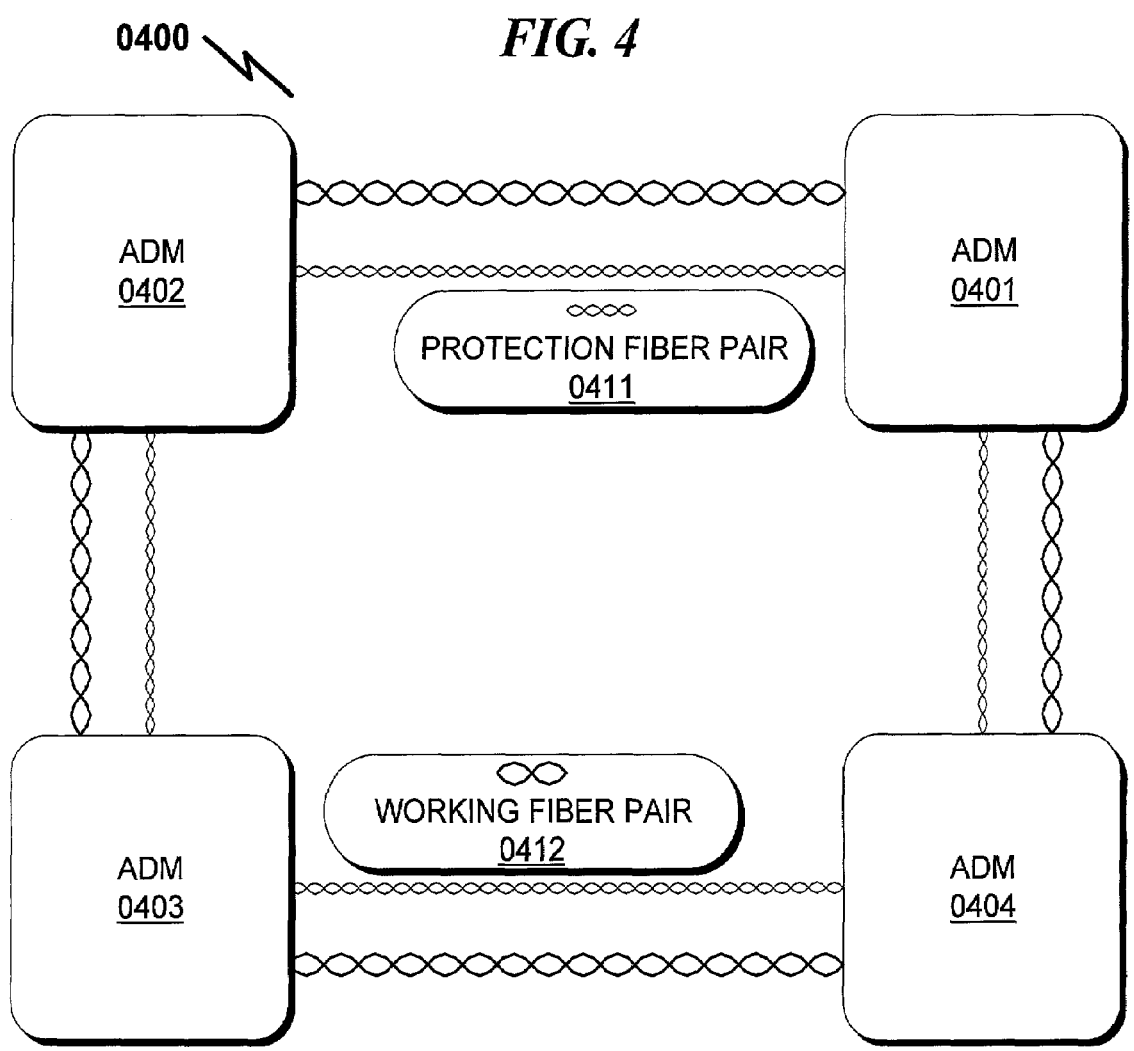
FIG. 4 illustrates a prior art bi-directional line-switched self-healing ring.
Figure 5:
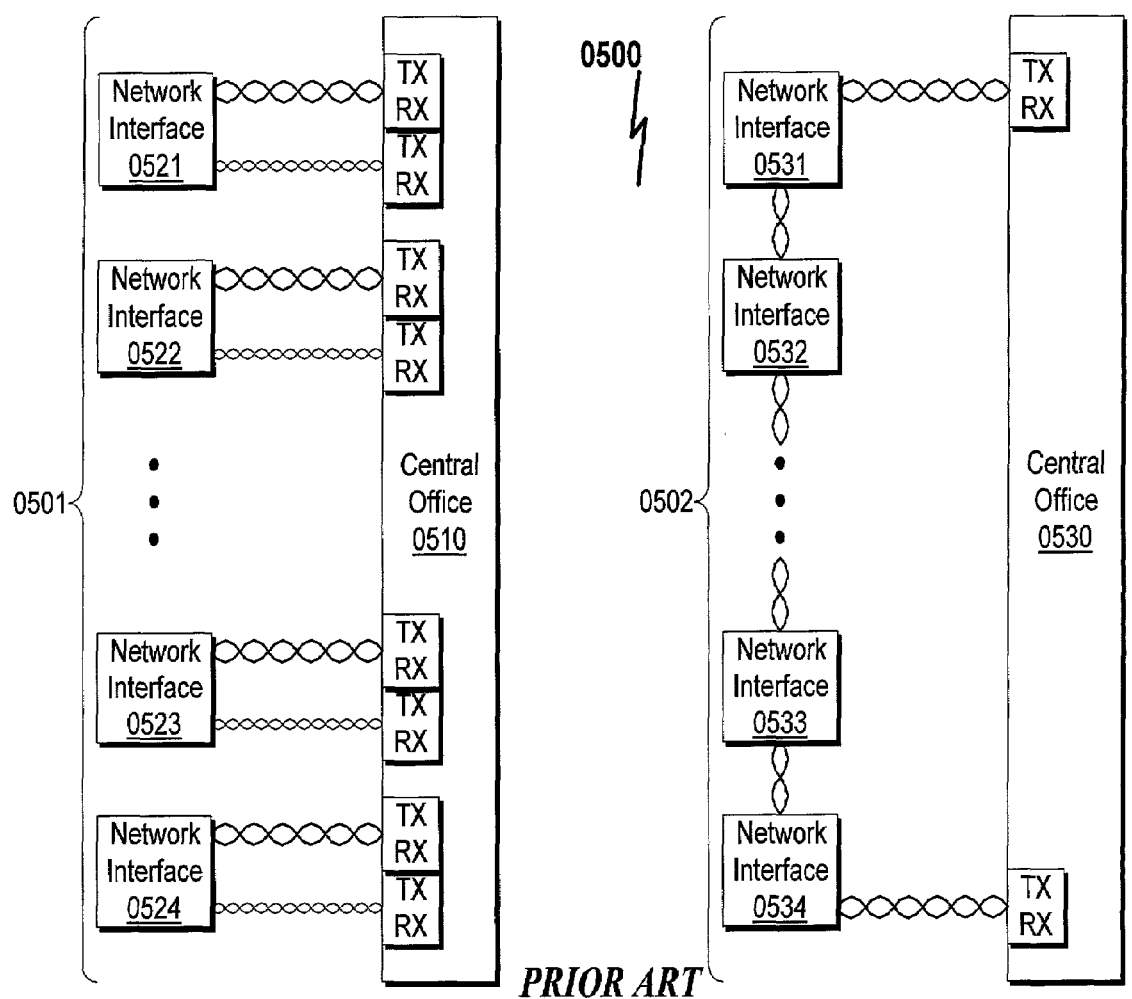
FIG. 5 illustrates several examples of prior art fault-tolerant switching methods.
Figure 6:
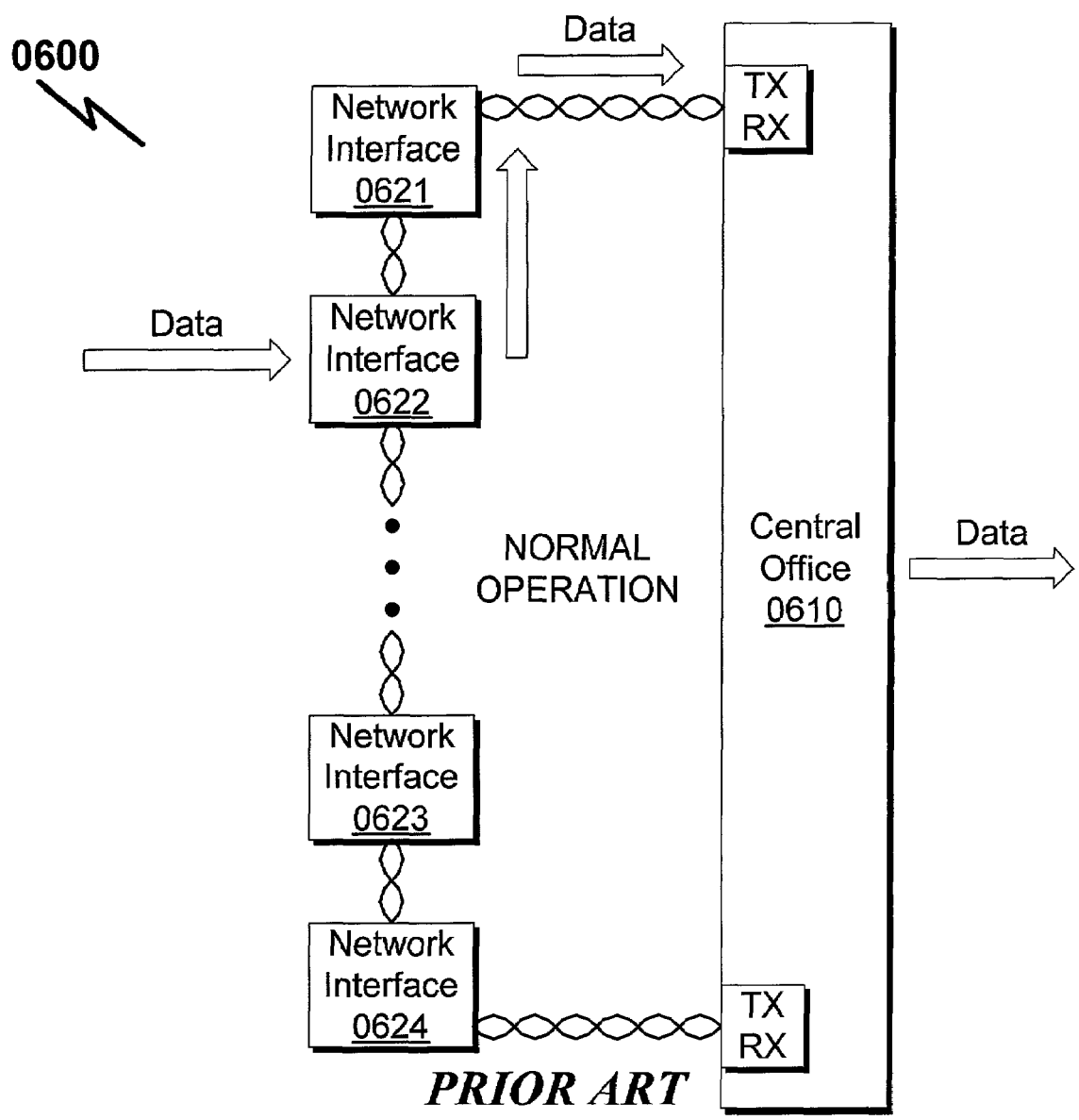
FIG. 6 illustrates prior art path protective switching under normal operating conditions.
Figure 7:
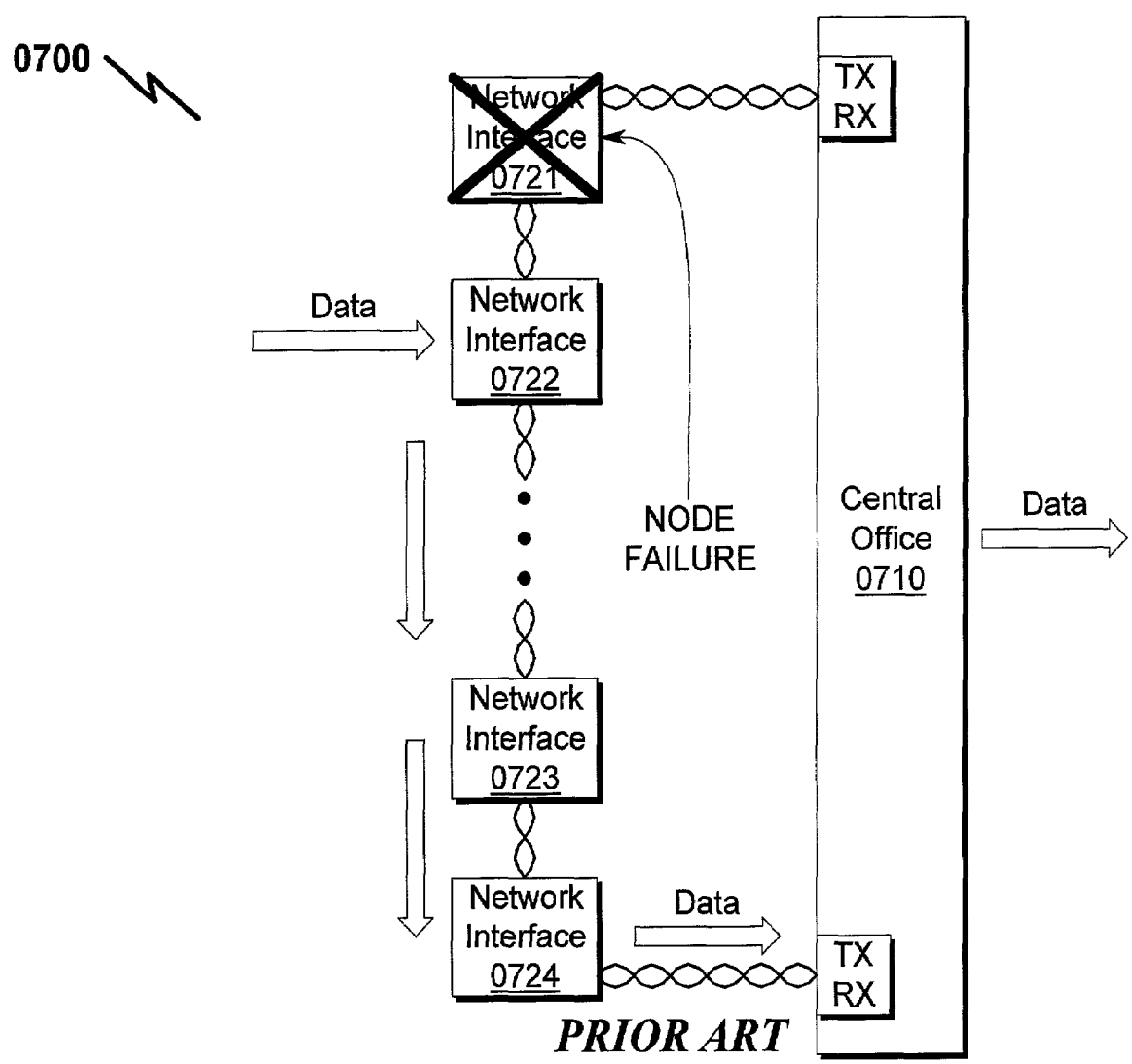
FIG. 7 illustrates prior art path protective switching under node failure operating conditions.
Figure 8:
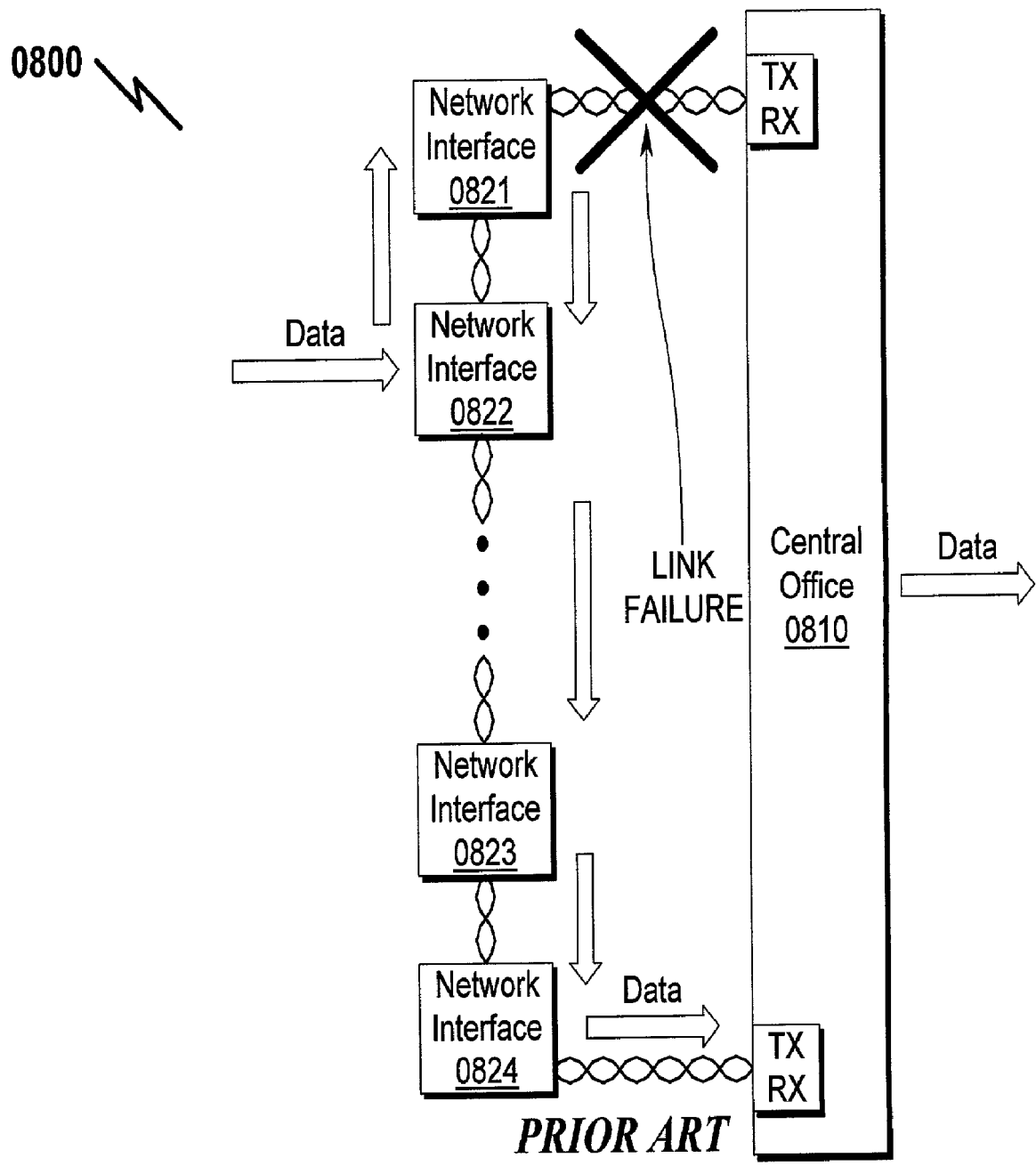
FIG. 8 illustrates prior art path protective switching under link failure operating conditions.
Figure 9:
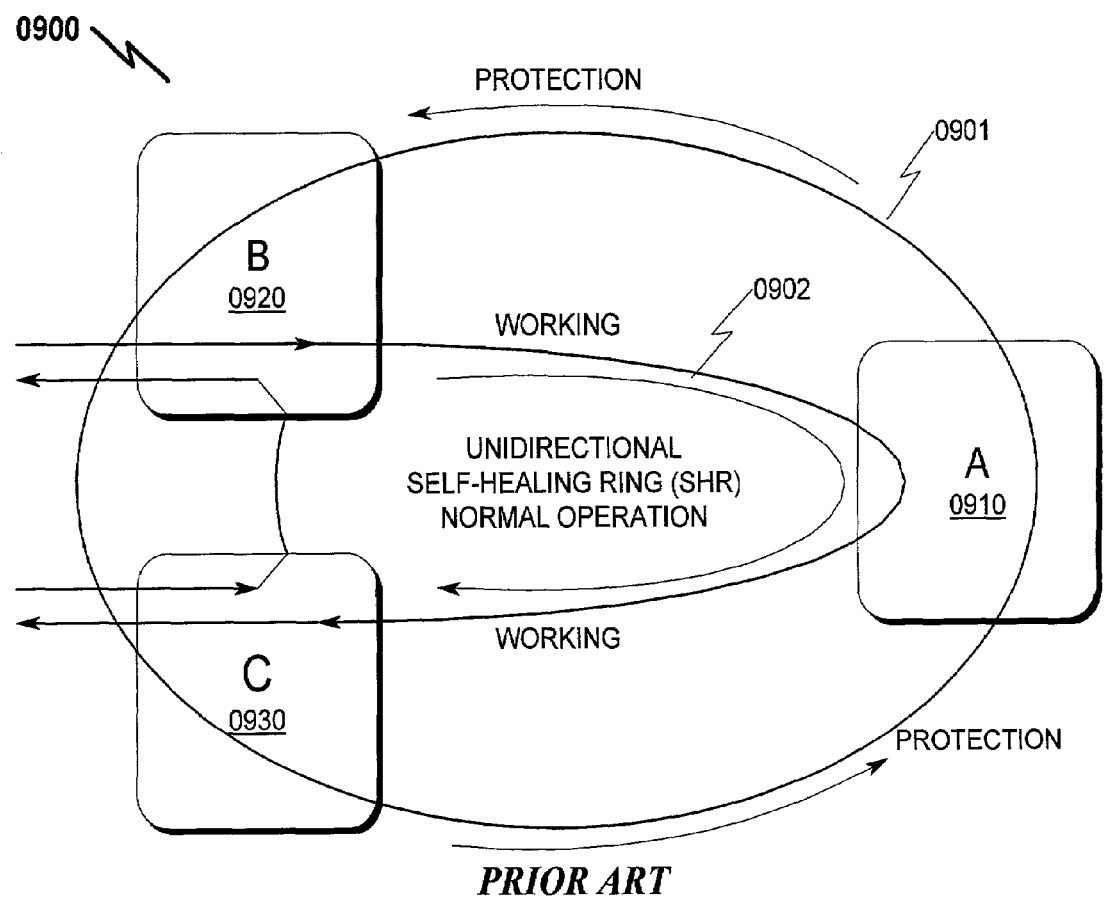
FIG. 9 illustrates prior art path protection ring recovery under normal operating conditions.
Figure 10:
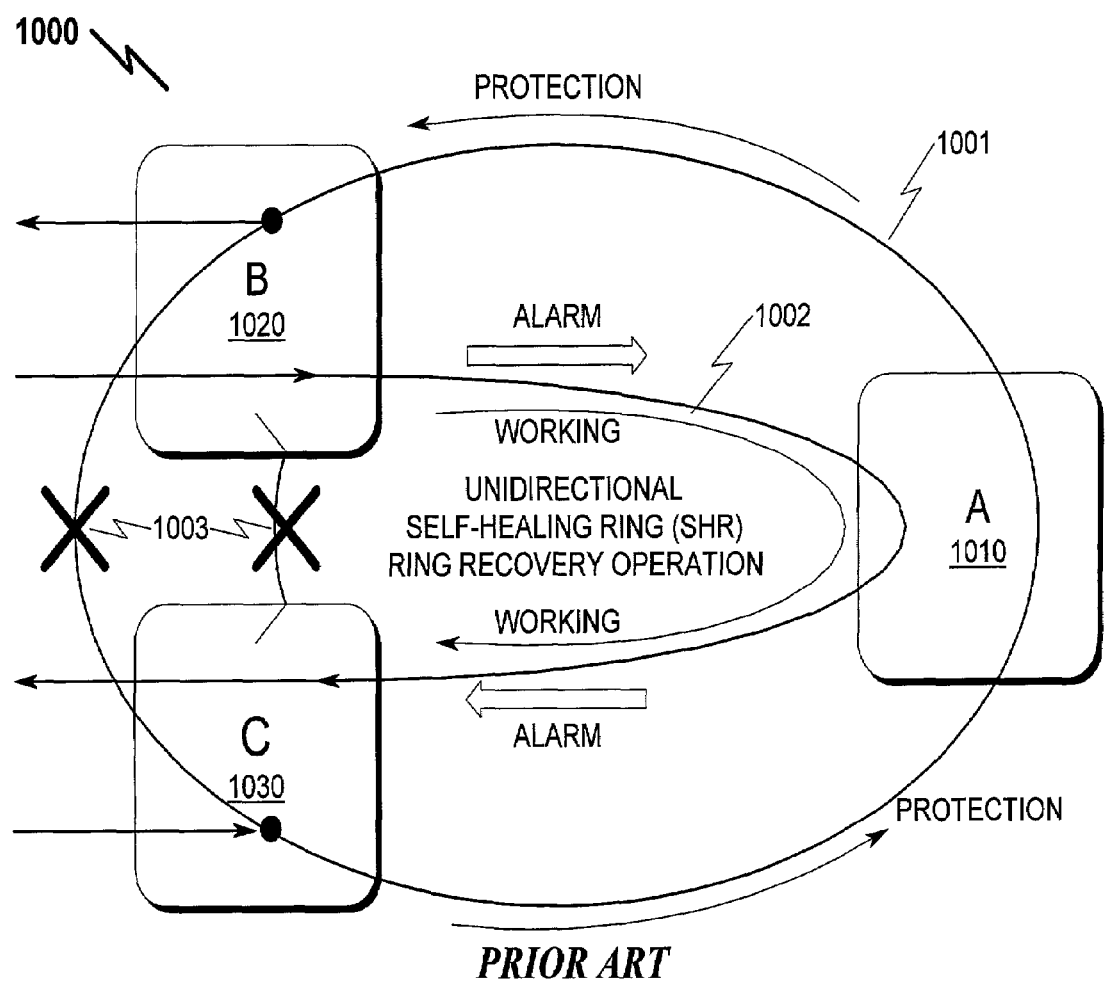
FIG. 10 illustrates prior art path protection ring recovery under link failure operating conditions.
Figure 11:
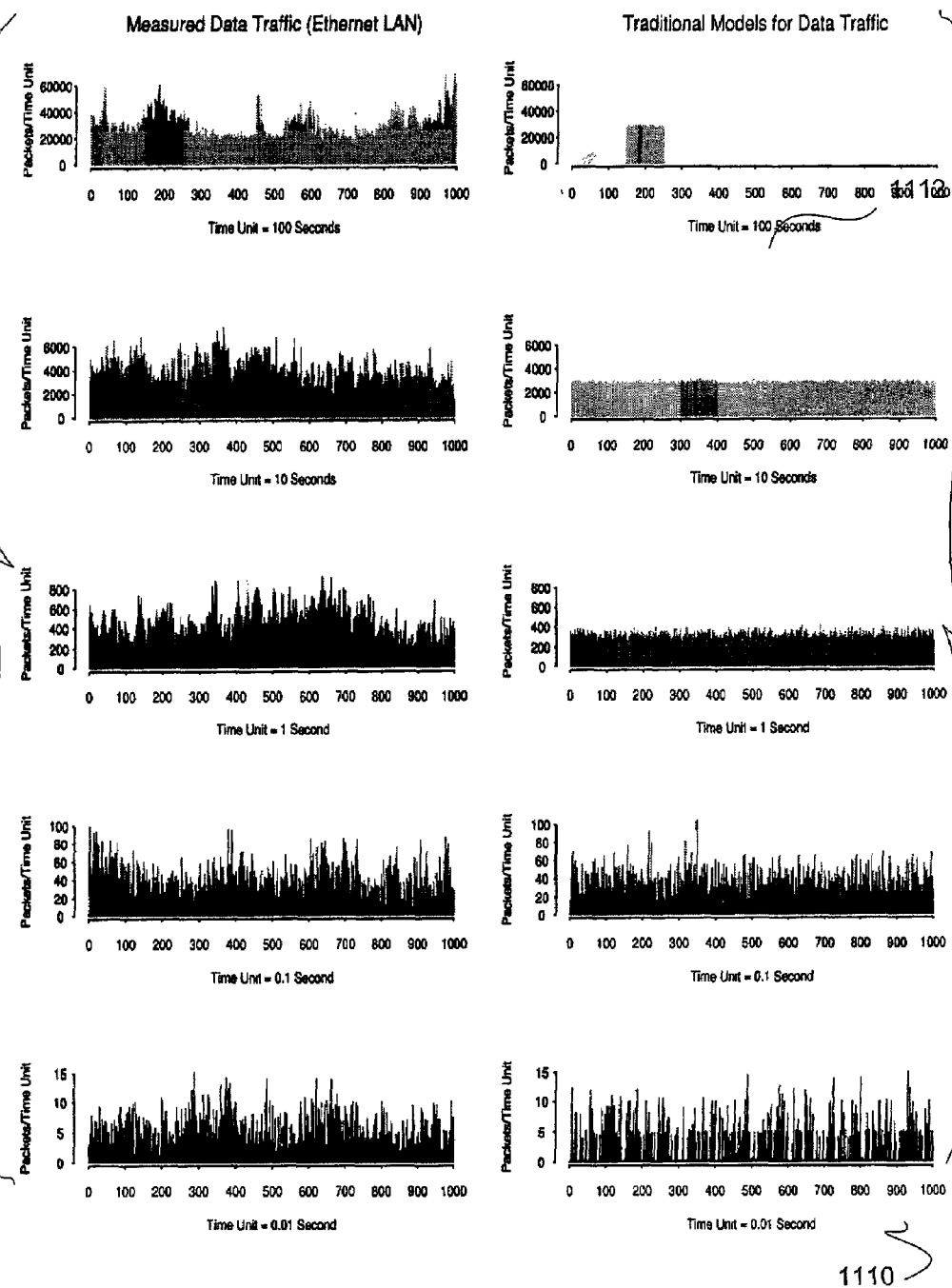
FIG. 11 shows a comparison between bursty data traffic and non-bursty voice traffic.
Figure 12:
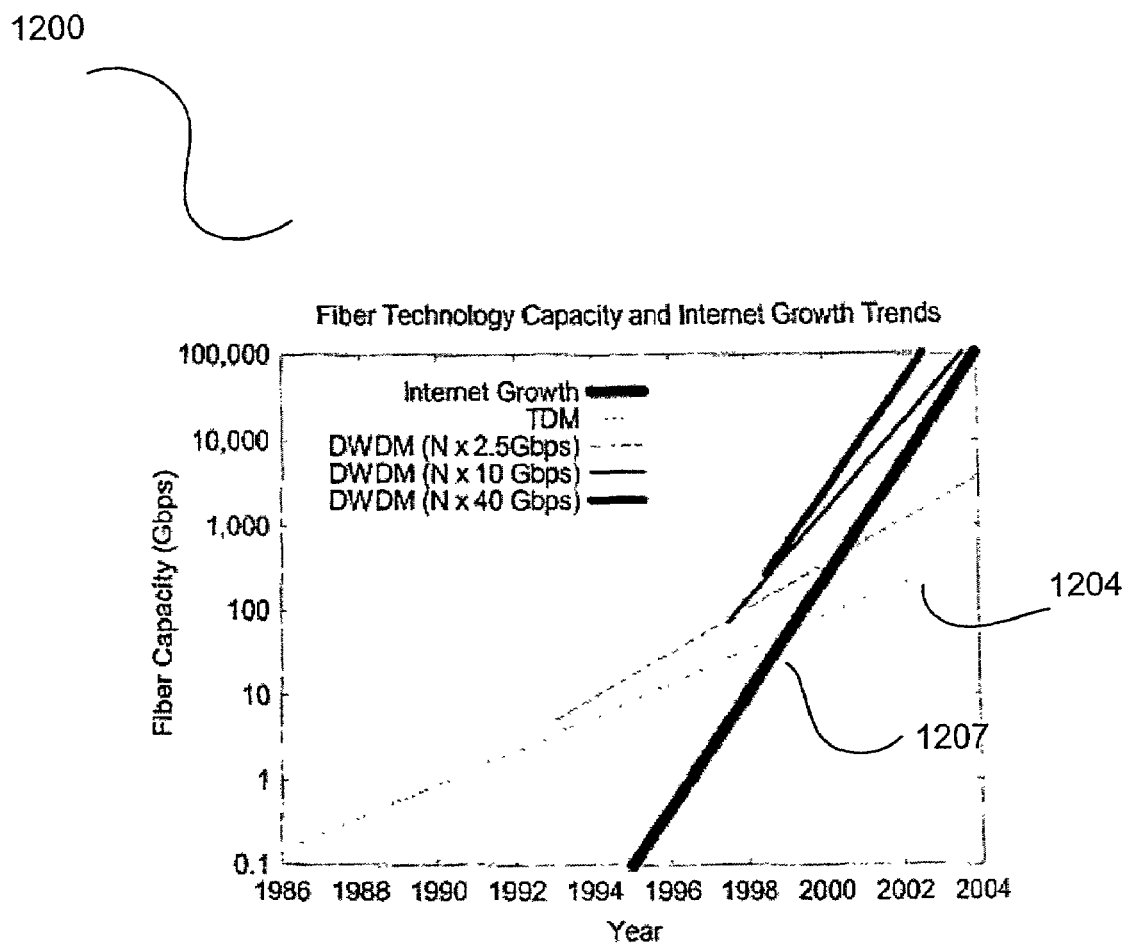
FIG. 12 illustrates current trends in fiber technology capacity and Internet bandwidth growth.
Figure 13:
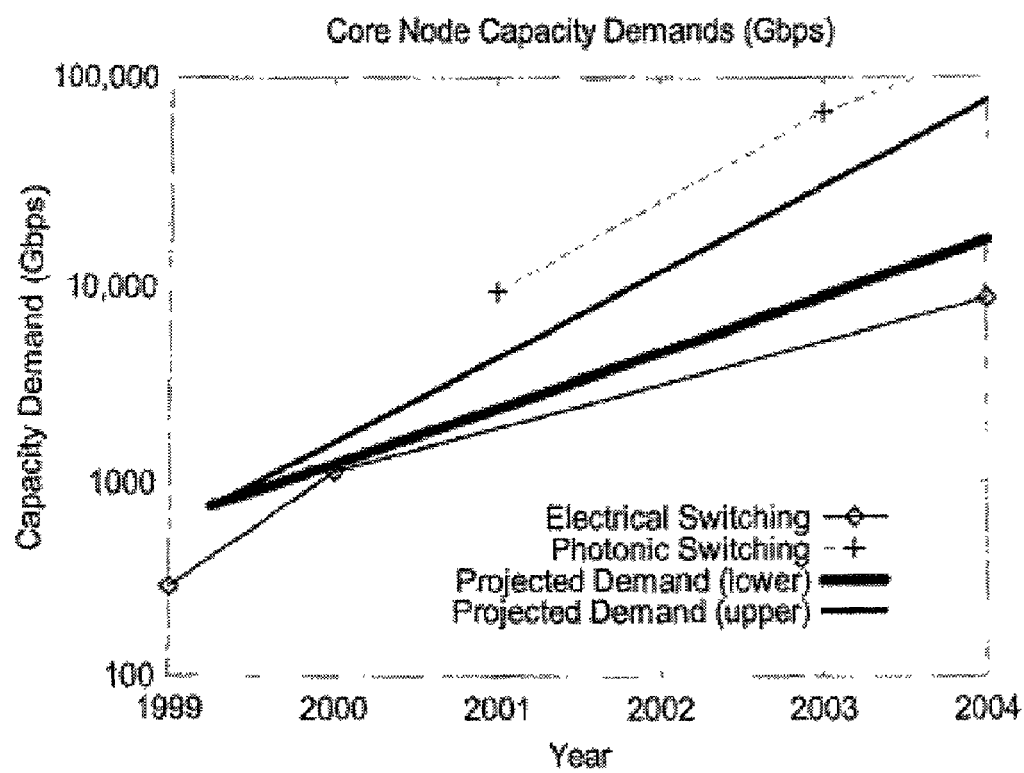
FIG. 13 illustrates current trends in core node bandwidth capacity demands.
Figure 14:
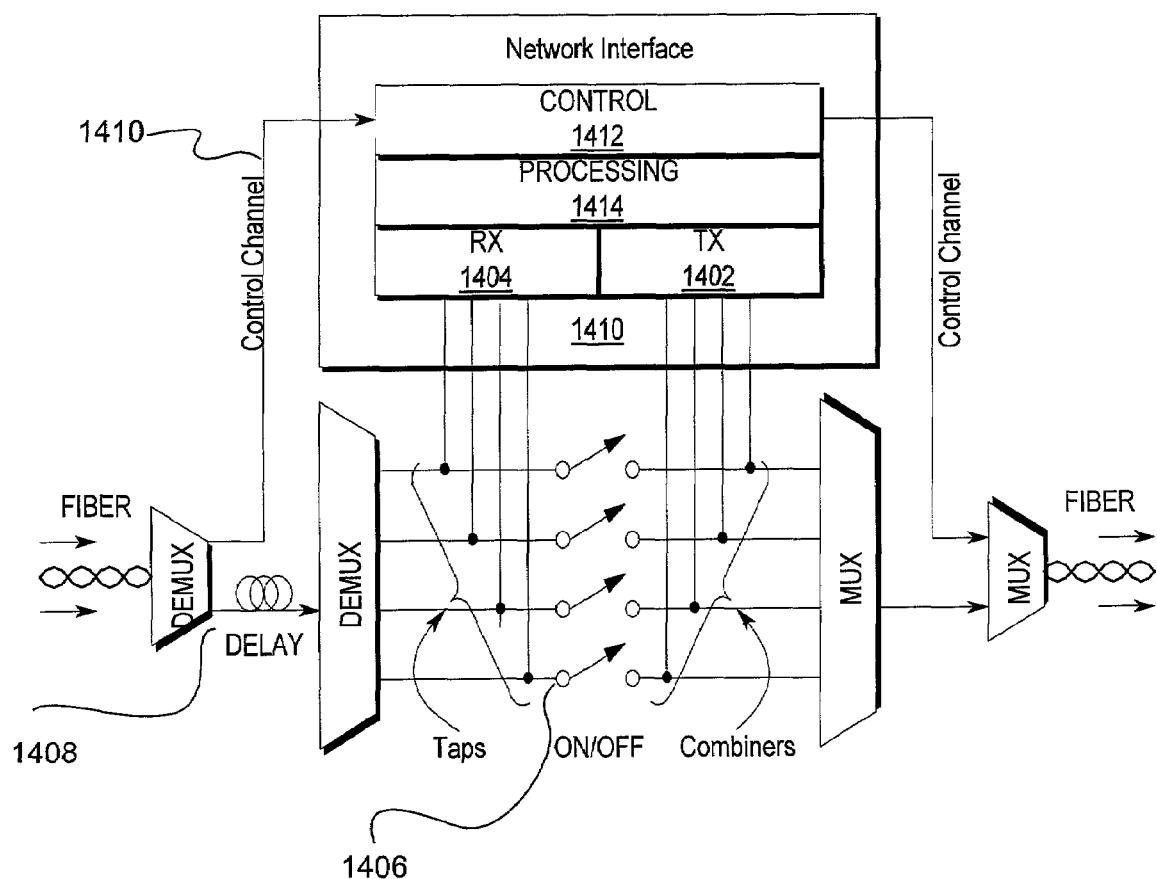
FIG. 14 illustrates a prior art WDM signaling and control system.
Figure 17:
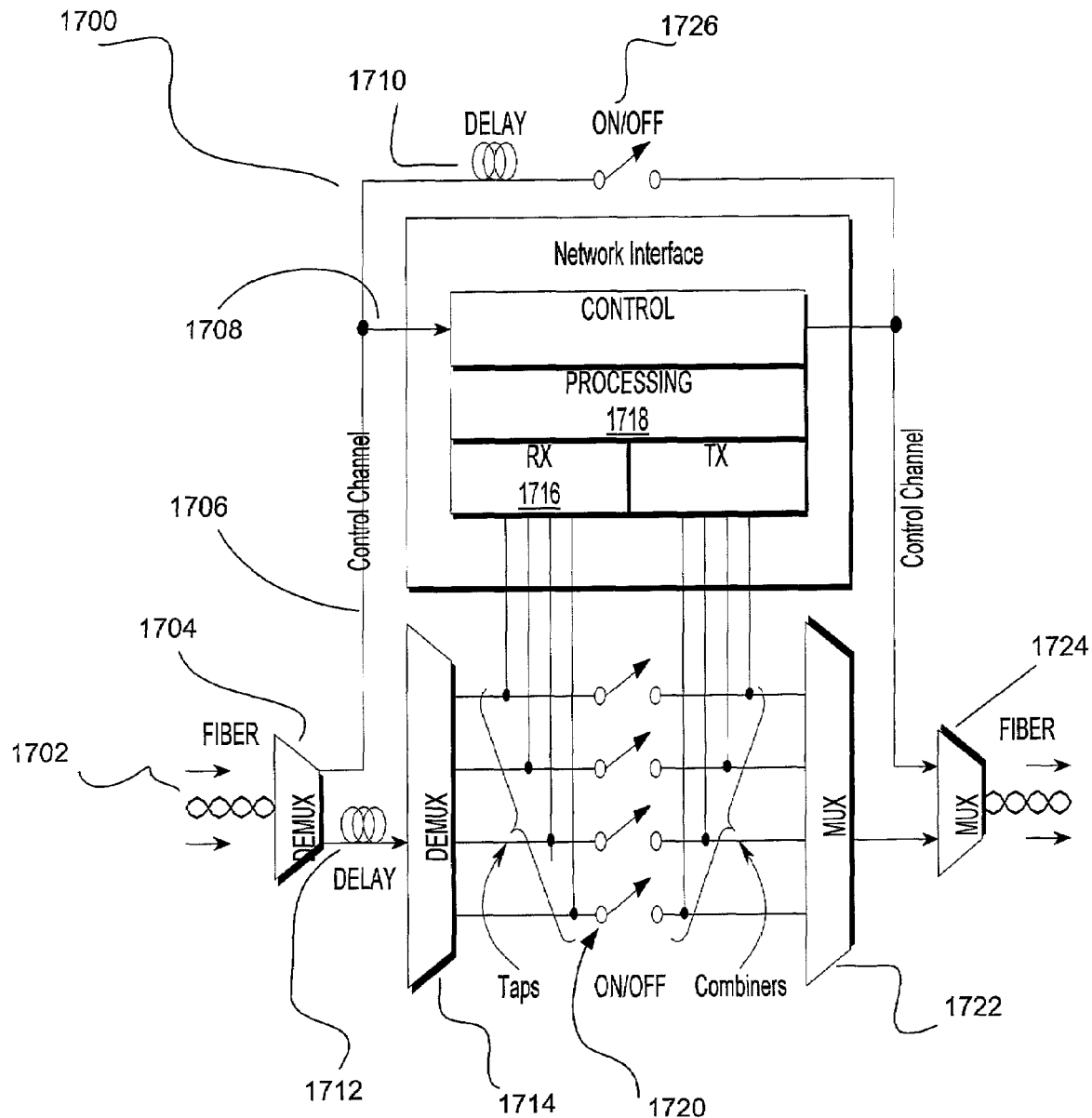
FIG. 17 is a block diagram of a node that includes a first demultiplexer for siphoning off the control channel.

FIG. 17 illustrates a node that embodies the present invention. It is similar to the node shown in FIG. 14 with the exception of the control channel bypass. The fiber (1702) carrying both the control channel and the other communication channels is initially demultiplexed to separate the control channel (1706). The control channel is tapped (1708) prior to the delay loop (1710). In other words, the control channel is processed while the communication channels are in their own delay loop (1712). Four communication channels are shown. In one embodiment, all of the channels are demultiplexed (1714). Each channel is also tapped into a receiver (1716) in the node. If the control channel token indicates that a payload is located on one of those tapped communications channels, then the receiver will pass the payload on for processing (1718). Further, the switch (1720) for that channel can be opened to clear the data payload from that channel. The data on the communication channels is then remultiplexed (1722). Further, the control channel is remultiplexed (1724) with the communication channels.

The switch (1726) allows the control channel tokens to be remultiplexed into the data stream unaltered. If a node (1700) fails and cannot rewrite a token, then the switch (1726) remains closed, its default position, and the token as received from upstream is allowed to pass. If the node is operating properly, then the token can be rewritten as needed and the switch (1726) is opened to clean the upstream token from the control channel. Thus, the token as received is cancelled and the newly rewritten token is remultiplexed into the data stream.

The node of FIG. 17 can be equipped with automatic protection switching (APS) to form a "greater" node. This includes opto-electronic switches, assemblies that allow normal (working) traffic flow in a clockwise direction, and shunt traffic onto and off of an auxiliary (protection) counterclockwise fiber ring under loss of signal on the working fiber. The fault can be in either a node or a fiber. In either case, it is important that a system be in place that allows the fault to be quickly isolated, tested, and a working data transfer solution be implemented.

In the adaptation of the SHR as taught by the present invention, each node is augmented with the ability to siphon and to transmit from within the SHR APS assemblies. This allows communication between the still-functioning portion of the ring and the portion of the ring isolated during a fault.

Figure 18:
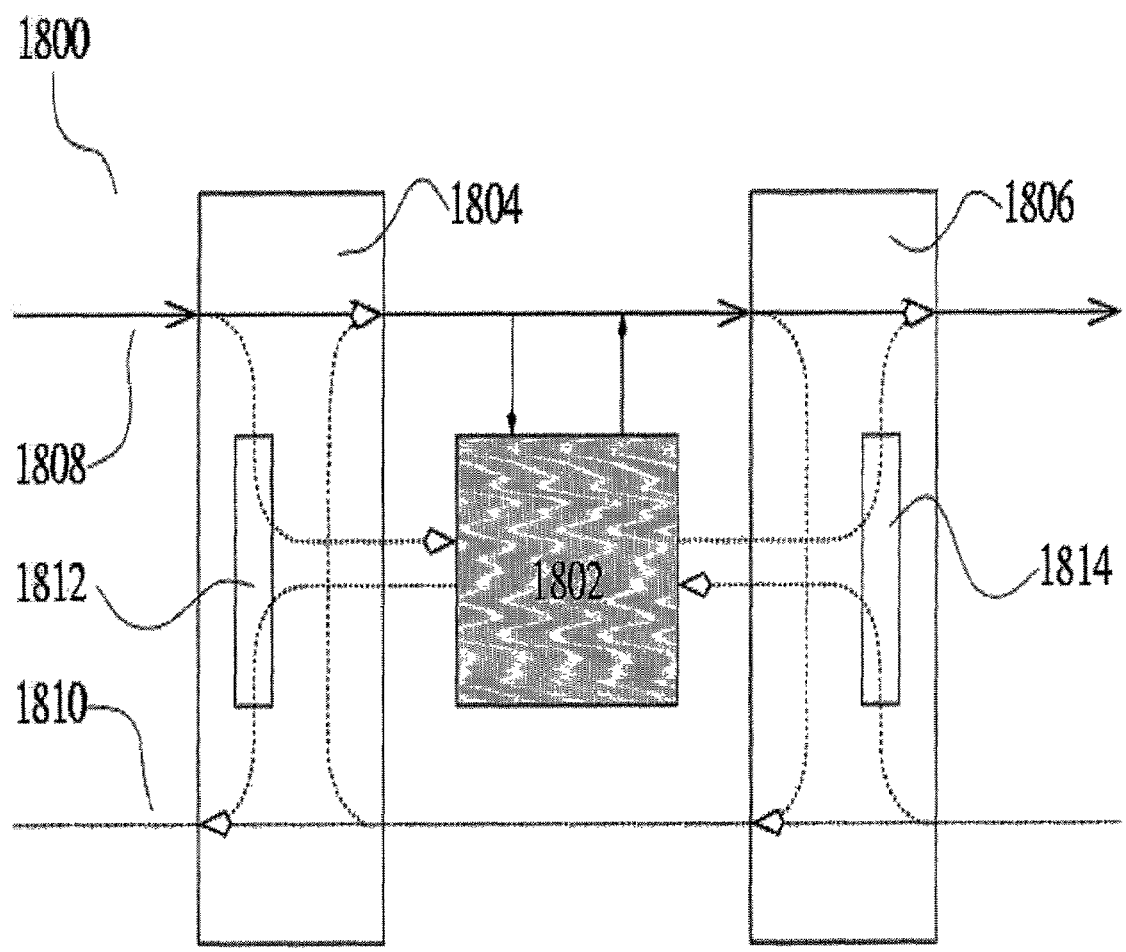
FIG. 18 illustrates a node embodying the present invention that incorporates automatic protection switching (APS)

Referring to FIG. 18, the automatic protection switching (APS) of the present invention is illustrated. The node (1802) can be equipped with an upstream and a downstream switch (1804, 1806) that can be used to alter the path of the data stream on the working fiber (1808). In this way, the APS switches can effect a self-healing ring topology using the protection fiber (1810). For example, the switches are shown in a normal position that allows the flow of the data stream over the working fiber until it is siphoned off by the node, as discussed above. Alternatively, in a fault condition the switch (1804, 1806) can be used to alter the data path to the protected fiber. A "subswitch" (1812, 1814) can also be used to create an alternate path between either the upstream and downstream nodes and the affected node. This "subswitch" is part of the physical architecture portion of the present invention.

FIGS. 19*a*, 19*b*, and 19*c* show the progression of the APS system in the presence of an inoperative node. In FIG. 19*a*, a data stream is carried over the working fiber (1908) past a first node (1902*a*). The first node (1902*a*) is equipped with an upsteam and a downstream APS (1904*a*, 1906*a*). When the data stream encounters a defective node 1902*b*, the token field for "last node seen" might not be properly rewritten. The controller in the next downstream node (1902*c*) will recognize that an upstream error has occurred. It will throw its upstream APS switch (1904*c*) into a bypass state as shown in FIG. 19*b*.

The node 1902*c* will also siphon off the data stream including the control channel tokens and allow it to dissapate because it is compromised. However, node C (1902*c*) will also regenerate new tokens for every communications channel and send those on around to node A (1902*a*) on the working fiber (1908). The regenerated tokens will indicate that node B (1902*b*) is suspect. When node A (1902*a*) receives the regenerated token it will throw its downstream APS switch (1906*a*) into the bypass state. This reroutes the data stream onto the protection fiber (1910). The data that is lost can be restored by a higher networking layer.

The subswitch (1912) is used to allow communication between nodes A, B, and C. Specifically, node A (1902*a*) can send control signals to node B (1902*b*) to test its operability and the integrity of the working fiber between nodes A and C. A first test signal can query node B (1902*b*) for a response, or to initiate a diagnostic test within node B. A second series of tests will send signals over all of the communication channels. Node C can monitor this test traffic to determine the condition of the working fiber.

In the event that the integrity of working fiber is confirmed, then node B remains isolated. In other words, the tokens rewritten by node C to indicate that node B should be isolated will remain so, unless node B is repaired, thereby preventing any node from sending data to node B. Once this testing is accomplished, the switches (1904, 1906) can be reset to redirect all traffic onto the working fiber, as shown in FIG. 19*c*. In the event that node B produces noise on the working fiber, even if isolated, then the protection path could be maintained.

Figure 20:
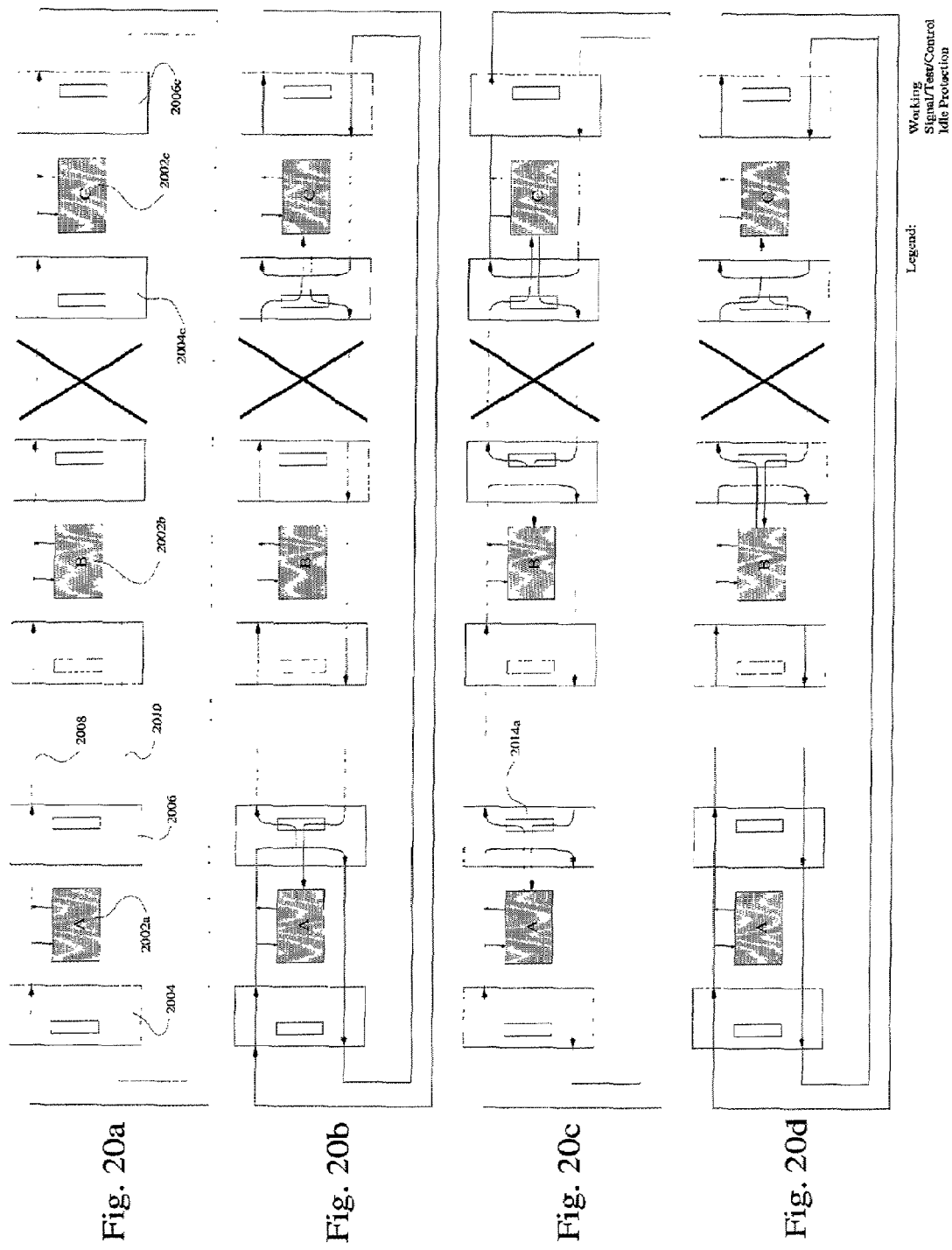
FIGS. 20a to 20d illustrate the APS steps involved when a fiber is cut.

FIGS. 20*a* illustrates the condition when a fiber (2008) fails between two nodes, for example node B (2002*b*) and node (2002*c*). It is important to note that the working fiber (2008) and the protection fiber (2010) may be closely coupled within the same cable. Thus, a cut through the working cable will likely create a cut across the protection cable as well. The first step in protection from such a failure is shown in FIG. 20*b*. Node C (2002*c*) detects a dark fiber condition and throws its upstream protection switch (2004*c*). As with a node failure, the upstream node B is isolated as shown in FIG. 20*b*, and all tokens are rewritten to indicate a possible failure in node B. Specifically, the downstream switch (2006*a*) is also thrown into a bypass condition.

Node A can initiate testing by sending control signals to node B. In this scenario, node B is operable and responds by throwing its downstream switch (2006*b*) into a bypass state as shown in FIG. 20*c*. This allows node B to establish a two-way communication with node A. Once A has determined that node B is operational then it resets its downstream protection switch (2006*a*) and regenerates all tokens, clearing the token field that had shown node B as inoperable, as shown in FIG. 20*d*. Data transfer then continues in a self-healing ring mode.

3. Token Formation, Bandwidth Allocation and Protection Protocals

Figure 21:
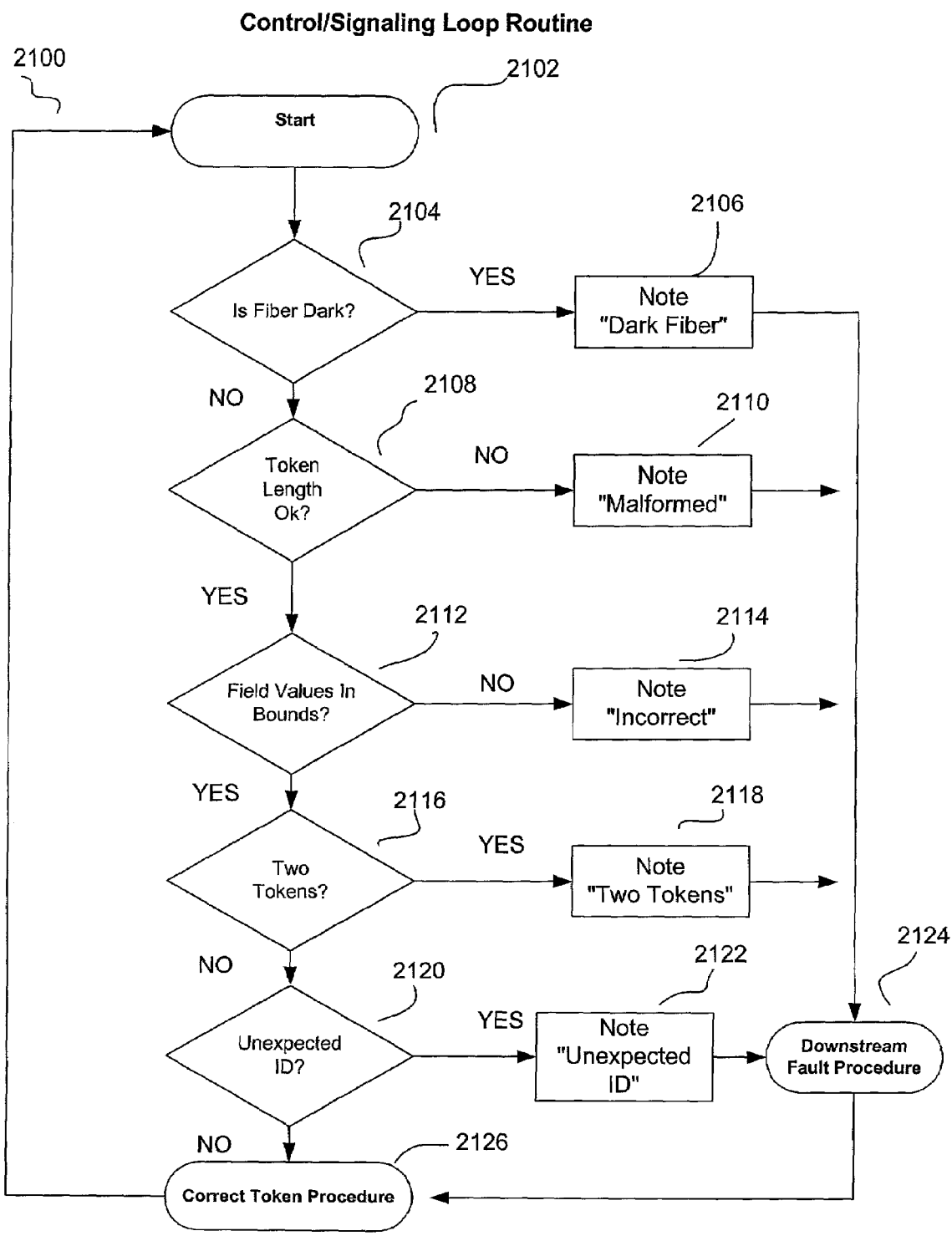
FIG. 21 is a top level flow chart showing the control and signalling loop routine.

FIGS. 21 to 26 provide various flowcharts that illustrate the method of operation of the present invention. For example, FIG. 21 illustrates the control and signalling loop routine (2100). The first decision (2104) involves determining whether the fiber is dark (i.e., that there is no signal whatsoever on any channel—optical receivers without filtering are indiscriminate as to wavelength, yielding the requisite "dark fiber sensor"). If yes, then the fact is noted (2106) and the routine proceeds to downstream fault procedures (2124). If the fiber is not dark, then the routine determines if the token is the correct length (2108). If not, then it is noted if the token is malformed (2110) and again the downstream fault procedures (2124) are implemented. Next, the token field values are examined to determine if the field values are within bounds (2112). If not, the fact is noted (2114). If so, then next query is whether there are two tokens (2116) for the same communications channel. If there are, the fact is noted (2118). If not, then the next query is whether there is an unexpected channel ID (2120) in the token. If so, the fact is noted (2122). If not, then the token has been received and is deemed accurate. The token is acted upon as discussed in reference to FIG. 17 above, and the Correct Token procedure is implemented (2126), after which the loop repeats (2102). If any faults are noted during this process, the downstream fault procedure (2124) is implemented.

Figure 22:
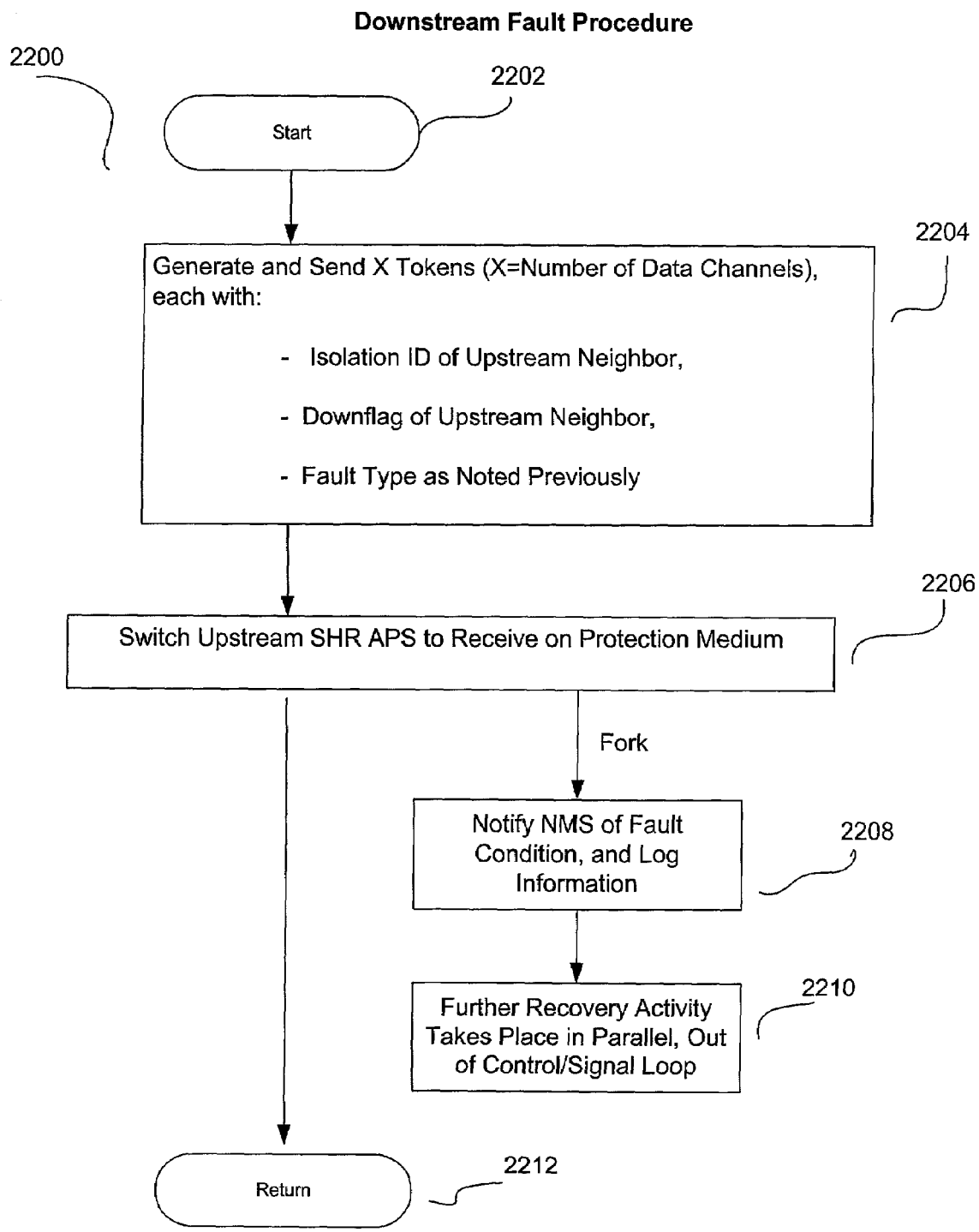
FIG. 22 is the downstream fault procedure flowchart

FIG. 22 illustrates the downstream fault procedure (2200). The procedure starts (2202) when a fault is detected by a downstream node. The downstream node must generate and send (2204) new tokens to all downstream nodes informing them of the fault. The number of new tokens must equal the number of communication channels. Each new token should mark the isolation ID with a designation for the upstream node and provide a fault type. Next, the first downstream node should also switch (2206) its upstream APS into a bypass mode. At this point, the process forks into two parallel processes. On one fork, the downstream node must notify the NMS of the fault condition and log the information (2208). Next, further recovery activity takes place out of the control/signal loop (2210), as discussed above in FIGS. 19*a* to 20*d*. In the other parallel process, after the upstream APS is placed into a bypass state (2206), the process returns (2212).

Figure 23:
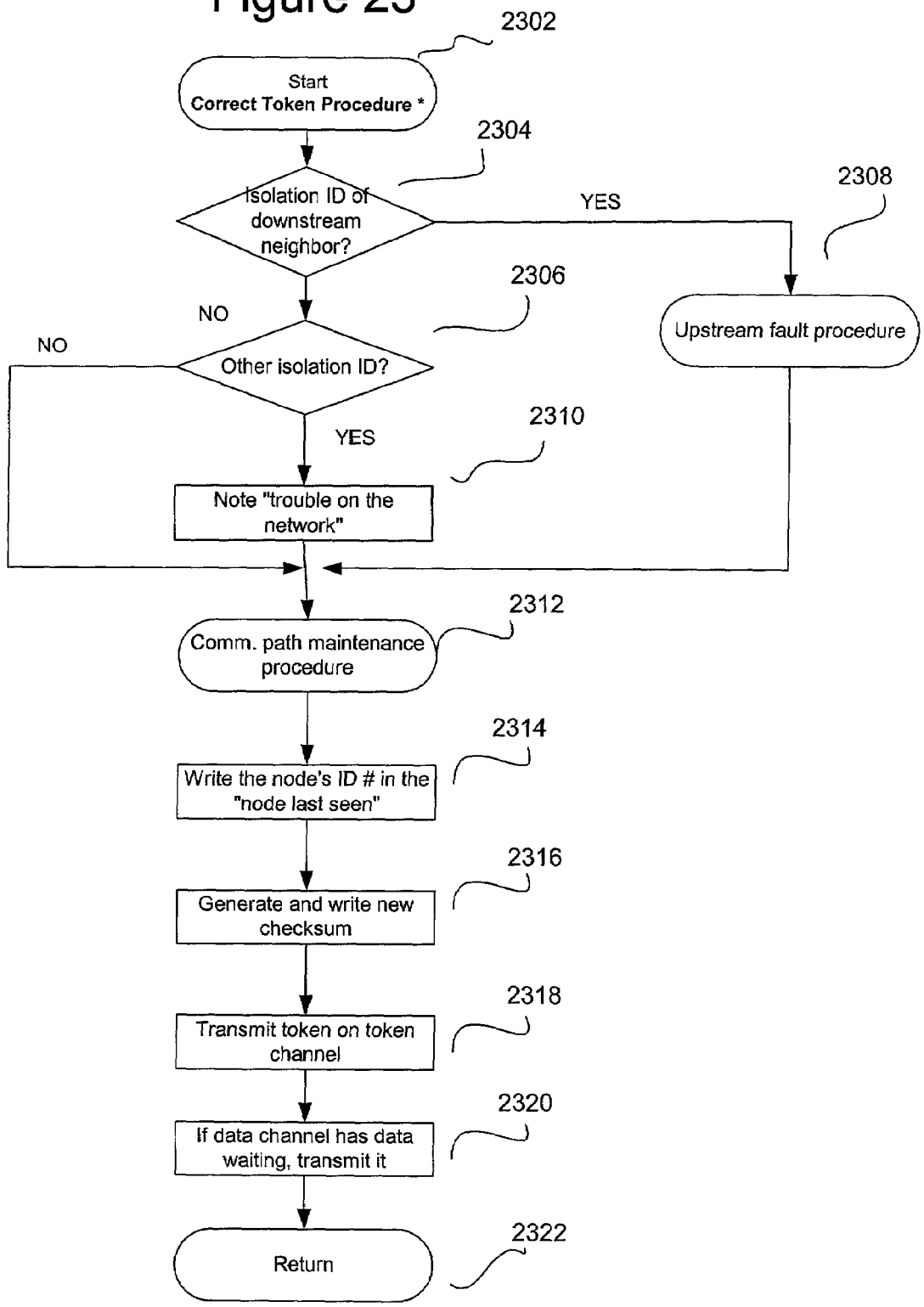
FIG. 23 is the flowchart showing the correct token procedure.

A correct token procedure (2300) is shown in FIG. 23. The procedure starts (2302) by looking for an isolation ID of the downstream neighbor (2304). If it is found, then the upstream fault procedures are implemented (2308). If not, then the routine looks for other isolation IDs (2306). If one is found, then the trouble on the network is noted (2310), in order to avoid sending data to suspect nodes. In any event, the routine continues to the communication path maintenance procedure (2312). Next, the routine writes (2314) its own node ID number in the node last seen field in the token. The routine also generates and writes a new checksum (2316). Next, the new token is transmitted on the control channel (2318). If the data channel has data waiting, it is transmitted (2320). Finally, the routine returns (2322) to the control/signaling loop (2100).

Figure 24:
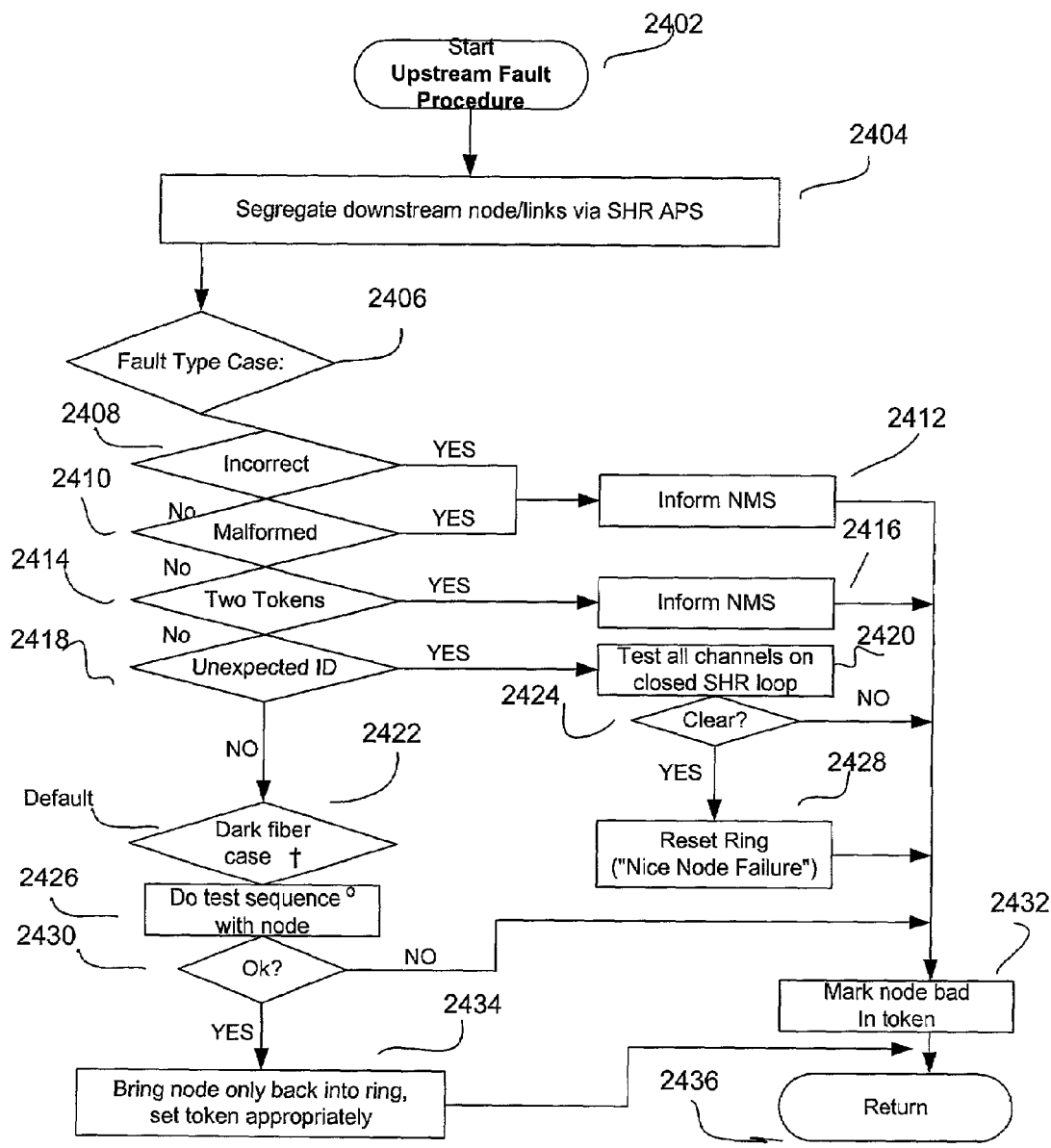
FIG. 24 is the upstream fault procedure flowchart.

FIG. 24 illustrates the upstream fault procedure (2402). It first throws its downstream SHR APS to segregate the downstream nodes and links (2404) and determines a fault type case (2406) as discovered in the control/signaling loop (2100). If the token is incorrect (2408) or if it is malformed (2410), it informs the NMS (2412). If two tokens exist (2414), then it also informs the NMS (2416) (in this case the suspect node's control bypass loop switch (1726) will not open properly). If there is an unexpected ID (2418), then the routine tests all channels on the closed SHR loop (2420). If clear (2424), then the ring is reset (2428). This last is the "nice node failure" scenario.

If there are no fault types, or a dark fiber fault is indicated, then the routine proceeds as if there was a dark fiber (2422). This requires that a test sequence be performed with the suspect node (2426). If it is okay (2430), then the node is brought back into the ring and the tokens reset appropriately (2434). If the test sequence reveals that the node is bad, then the node is marked bad (2432) and the routine returns (2436).

Figure 25:
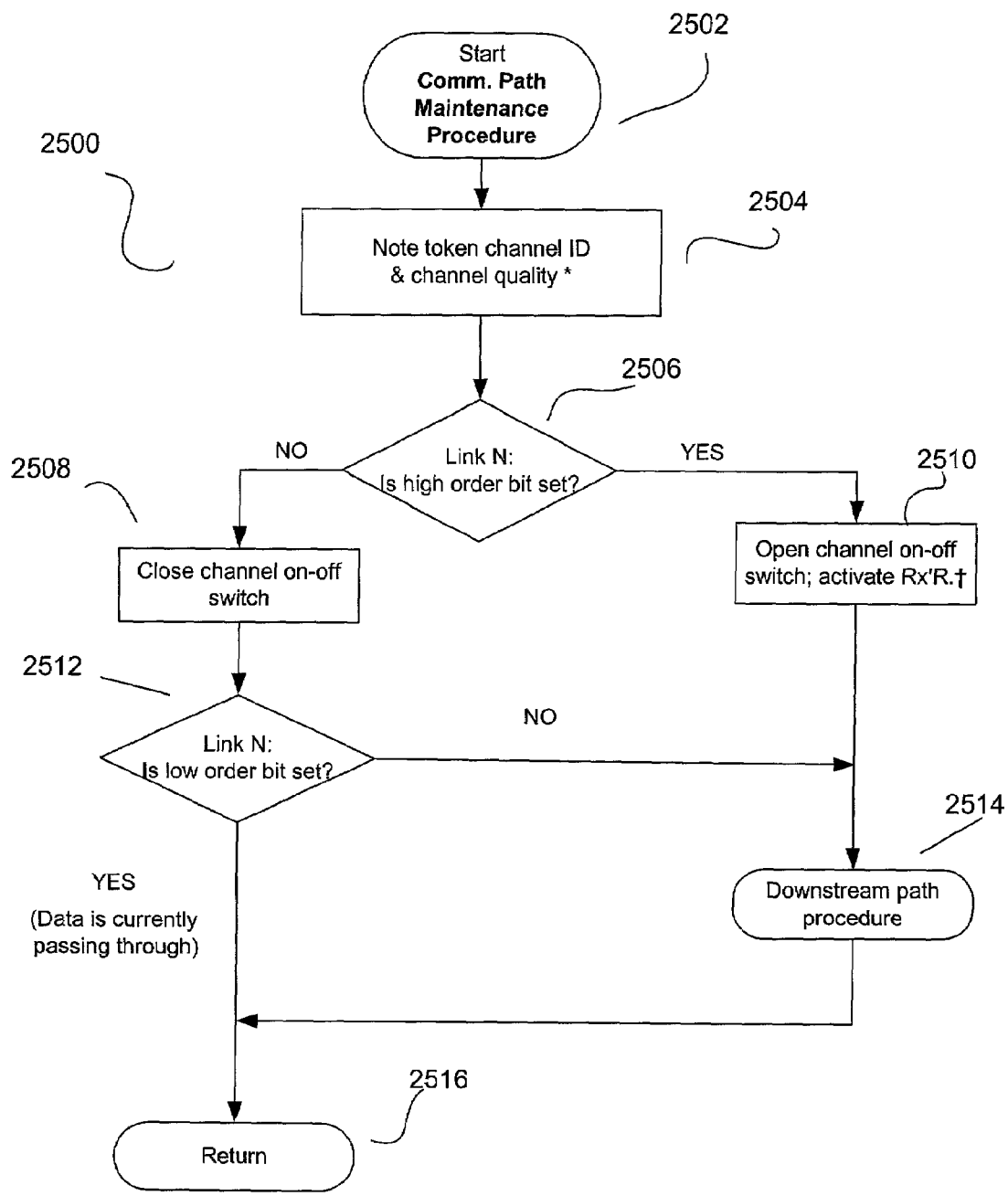
FIG. 25 is the communications paths maintanence procedure flowchart.

FIG. 25 illustrates the Communications path maintenance procedure (2500). The notation used here (and in FIG. 26) is meant to refer to node N as the one running the routine, link N as the link immediately upstream from node N, and link N+1 as the link immediately downstream from node N. Once started (2502), the routine examines (2504) the token's channel ID and the channel quality (channel quality is currently an unused field). For any particular link, the routine examines (2506) whether the high order bit is set in the token field (1604) shown in FIG. 16. If it is set, then the routine opens a channel on-off switch (2510) for that channel. Next, it completes the downstream path procedure (2514) and returns. Alternatively, if the high-bit order is not set (2506), then the routine closes the channel on-off switch (2508). Next, the routine determines whether the low-bit order is set (2512). If not, then the routine also proceeds to the downstream path procedure (2514) and then returns. However, if the low bit order is set, then the routine returns (2516).

Figure 26:
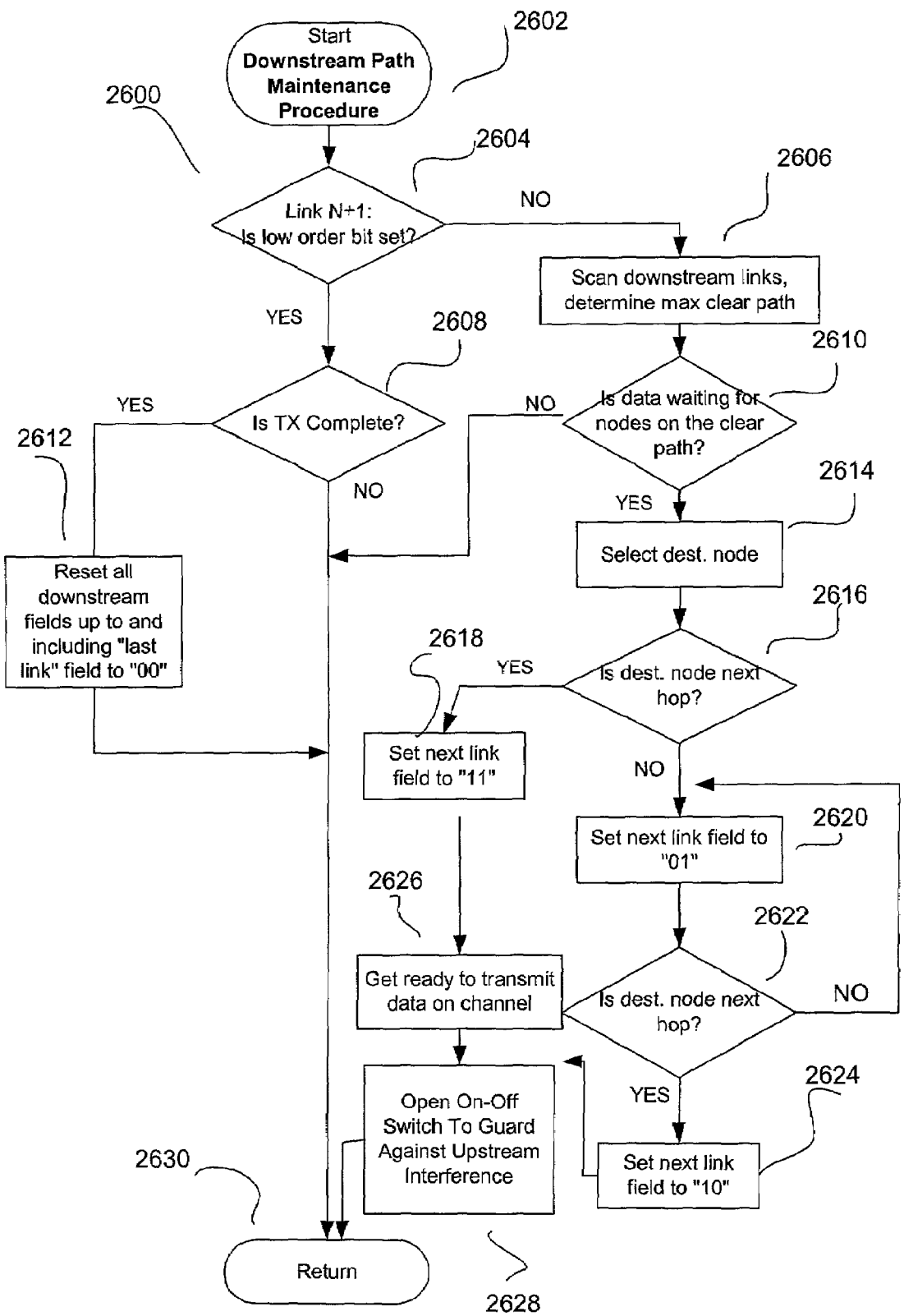
FIG. 26 is the downstream path maintenance procedure flowchart.

FIG. 26 provides additional details regarding the downstream path maintenance procedure (2600). The procedure starts (2602). For link N+1, the routine determines whether the low-bit order is set (2604). If yes, the routine determines whether the transmission is complete (2608). If yes, then the routine resets all downstream fields up to and including the "last link" field to (00). The routine then returns (2630) to start.

If, however, the low order bit is not set, then the routine scans downstream links to determine the maximum clear path (2606). Next, the routine decides whether data is waiting for nodes on the clear path (2610). If not, then the routine resets. If so, the routine selects the destination node (2614). If the destination node is the next hop (2616), then the node sets (2618) the next link field to (11). If not, it sets the field to (01) (2620). The routine then continues to inquire whether the next node is the destination node (2622). If so, it sets the next link field to (10) and gets ready to transmit data on the selected communications channel (2626). Finally, the routine opens the on-off switch to guard against upstream interference (2628).

4. Definitions, Disclaimers and Expansions

The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Throughout the discussion herein there are examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications.

Throughout the discussion herein the terms Internet and Intranet are used generally to denote any network communication system or environment. Generally the term Intranet will denote communications that are local to a given system or user, and Internet will describe communications in a more distant locale. One skilled in the art will recognize that these terms are arbitrary within the contexts of modern communication networks and in no way limitive of the scope of the present invention.

The present invention may be embodied in a variety of data structures in some preferred embodiments. However, the form of such data structures as described herein is only exemplary. One skilled in the art would quickly realize that a wide variety of other data structures could be used equivalently in this application. Therefore, no data structure contained herein should be interpreted as limiting the scope of the present invention.

While the present invention is optimally adapted to use in communications systems utilizing existing standards of data framing, such as Synchronous Optical Networks (SONET) and Synchronous Digital Hierarchy (SDH) communications systems, varieties of Ethernet, Fibre Channel, or even no framing, such as providing clear channels on demand; and specifically those incorporating wavelength division multiplexing (WDM), dense wavelength division multiplexing (DWDM), and ultra-dense wavelength division multiplexing, the teachings presented are equally well adapted to situations where other communications mediums are utilized in a multi-carrier, wireless, or spread-spectrum environment, among others.

The numerous innovative teachings of the present application have been described with particular reference to the presently preferred embodiment, wherein these innovative teachings are advantageously applied to the particular problems of an Dynamic Communication Channel Allocation System and Method. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

The invention claimed is:

1. A method of dynamically allocating bandwidth in a fully distributed ring-topology communications network, the network comprising a plurality of nodes connected by inter-nodal links, wherein each link comprises at least one data channel and at least one control channel, and wherein the control and data channels are treated by the plurality of nodes as shared resources, and wherein each data channel is represented on the at least one control channel by one token, and wherein the token comprises an array of bit fields with each bit field representing one inter-nodal link on the network, and wherein control over the network is fully distributed among the nodes such that multiple nodes may communicate simultaneously over a single data channel, the method comprising:
    (a) transmitting the token(s) on the at least one control channel; and
    (b) evaluating the token(s) at each node to determine if a corresponding data payload is destined for and simultaneously arriving at that node on the data channel represented by that token,
    wherein the token further comprises:
        a channel ID field; and
        a communications path status array, wherein each communications path status array element comprises a field of at least two bits, and wherein the field comprises: a first value that indicates that the corresponding link is currently available; a second value that indicates that the link associated with that subfield is either a source link or an intermediate link; a third value that indicates that the corresponding link is a destination link; and a fourth value that indicates that the link is the only link between the source of the data transmission and its destination.

2. The method of claim 1 wherein communications path status array element comprises a two bit field, and wherein a first value of binary (00) means the corresponding link is currently available, a second value of binary (01) means that the link associated with that subfield is either a source link or an intermediate link, a third value of binary (10) means that the corresponding link is a destination link, and a fourth value of binary (11) means that the link is the only link between the source of the data transmission and its destination.

3. A node for use in a fully distributed ring-topology communications network having a plurality of such nodes connected by inter-nodal links, wherein each link comprises at least one control channel and a plurality of data channels, wherein each discrete data channel is represented on the at least one control channel by one token, and wherein the token comprises an array of bit fields with each bit field representing one inter-nodal link on the network, the node comprising:
    a first demultiplexer for splitting the at least one control channel from the plurality of data channels;
    a controller coupled to the control channel for evaluating and/or updating the token;
    one on-off switch per discrete data channel, wherein the switch allows the controller to remove the data signal from the respective data channel;
    a second demultiplexer for splitting the plurality of data channels into discrete data channel signals traveling over an array of waveguides;
    at least one tunable receiver coupled with the plurality of data channel signals;
    at least one waveguide switch per waveguide, wherein the at least one on-off switch allows the controller to remove data from the respective discrete data channel signal;
    at least one tunable transmitter coupled with the plurality of data channel signals, downstream from the on-off switches, wherein the at least one transmitter allows the controller to insert a data signal onto one of the plurality of data channels;
    a second multiplexer for recombining the discrete data channel signals into the plurality of data channels;
    a first multiplexer for recombining the at least one control channel with the plurality of data channels; and
    a delay loop, wherein, if the node is a destination node for the data simultaneously arriving at the node, the delay loop delays the data signal on the respective data channel sufficiently to allow the controller to remove its respective token from the control channel, replace it with the respective updated token on the control channel, cause the on-off switch on the respective data channel to remove the arriving data from the respective data channel, and tell the receiver that is presently tuned to said data channel to receive said data signal, and wherein, if the node is not a destination node for data possibly arriving on the respective data channel, the delay loop delays the arrival of the plurality of data channel signals sufficiently to allow the controller to examine and resynchronize the respective token on the control channel with the data on its respective data channel, cause the on-off switch on the respective data channel to allow the respective data signal to pass through the node freely, and tell the receiver that is presently tuned to the data channel to ignore the data signal.

4. The node of claim 3 wherein the token further comprises:
    (a) a channel ID field; and
    (b) a communications path status array.

5. The node of claim 4 wherein each element of the communications path status array comprises a two-bit field.

6. The node of claim 4, the communications path status array comprising:
    a two-bit field, wherein:
        a binary value of (00) means the corresponding link is currently available;
        a binary value of (01) means that the link associated with that subfield is either a source link or an intermediate link;
        a binary value of (10) means that the corresponding link is a destination link; and
        a binary value of(11) means that the link is the only link between the source of the data transmission and its destination.

7. A fully distributed ring-topology communications network, the network comprising:
    a plurality of nodes connected by inter-nodal links, wherein each link comprises:
        at least one data channel; and
        at least one control channel, wherein the control and data channels are treated by the plurality of nodes as shared resources, and wherein each data channel is represented on the at least one control channel by one token, and wherein the token comprises:
- an array of bit fields, wherein each bit field represents one inter-nodal link on the network;
- a channel ID field; and
- a communications path status array, wherein each communications path status array element comprises a field of at least two bits, and wherein the field comprises: a first value that indicates that the corresponding link is currently available; a second value that indicates that the link associated with the subfield is either a source link or an intermediate link; a third value that indicates that the corresponding link is a destination link; and a fourth value that indicates that the link is the only link between the source of the data transmission and its destination, and wherein control over the network is fully distributed among the nodes such that multiple nodes may communicate simultaneously over a single data channel, and wherein each node is capable of processing the token while simultaneously processing the related data payload.

wherein control over the network is fully distributed among the nodes such that multiple nodes may communicate simultaneously over a single data channel, and wherein each node is capable of processing the token while simultaneously processing the related data payload.

* * * * *

UNITED STATES PATENT AND TRADEMARK OFFICE
CERTIFICATE OF CORRECTION

| | | |
|---|---|---|
| PATENT NO. | : 7,388,872 B2 | Page 1 of 1 |
| APPLICATION NO. | : 10/118084 | |
| DATED | : June 17, 2008 | |
| INVENTOR(S) | : Charles D. Montgomery, Jr. | |

It is certified that error appears in the above-identified patent and that said Letters Patent is hereby corrected as shown below:

Column 4, line 37, please delete "modem" and insert --modern-- therefore.
Column 5, line 64, please delete "modem" and insert --modern-- therefore.
Column 6, line 2, please delete "modem" and insert --modern-- therefore.

Column 17, Claim 2, line 1, please insert --the-- after "wherein".
Column 20, Claim 7, please delete lines 10-14 as they are duplicates of lines 5-9.

Signed and Sealed this

Second Day of September, 2008

JON W. DUDAS
*Director of the United States Patent and Trademark Office*